US010451785B2

(12) United States Patent
Yang et al.

(10) Patent No.: US 10,451,785 B2
(45) Date of Patent: Oct. 22, 2019

(54) POLARIZER, MANUFACTURING METHOD THEREOF AND DISPLAY DEVICE

(71) Applicants: BOE Technology Group Co., Ltd., Beijing (CN); Beijing BOE Optoelectronics Technology Co., Ltd., Beijing (CN)

(72) Inventors: Jiuxia Yang, Beijing (CN); Hongbo Feng, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 264 days.

(21) Appl. No.: 15/104,091

(22) PCT Filed: Oct. 10, 2015

(86) PCT No.: PCT/CN2015/091654
§ 371 (c)(1),
(2) Date: Jun. 13, 2016

(87) PCT Pub. No.: WO2016/197493
PCT Pub. Date: Dec. 15, 2016

(65) Prior Publication Data
US 2017/0123126 A1 May 4, 2017

(30) Foreign Application Priority Data
Jun. 11, 2015 (CN) .......................... 201510320735.7

(51) Int. Cl.
G02B 5/30 (2006.01)
G02B 1/14 (2015.01)
(Continued)

(52) U.S. Cl.
CPC ........... *G02B 5/3058* (2013.01); *B22D 25/06* (2013.01); *B22D 27/02* (2013.01); *B22D 29/00* (2013.01);
(Continued)

(58) Field of Classification Search
CPC ............. G02B 5/3058; B22D 27/02; B29D 11/00644; G02F 2001/133548; G02F 1/133538
See application file for complete search history.

(56) References Cited

U.S. PATENT DOCUMENTS

2008/0158501 A1  7/2008  Matsunami et al.
2008/0186576 A1  8/2008  Takada
(Continued)

FOREIGN PATENT DOCUMENTS

CN  101185013 A  5/2008
CN  101354458 A  1/2009
(Continued)

OTHER PUBLICATIONS

Mar. 17, 2016—(WO)—International Search Report and Written Opinion Appn PCT/CN2015/091654 with English Tran.
(Continued)

*Primary Examiner* — Jessica M Merlin

(57) ABSTRACT

A polarizer, a manufacturing method thereof and a display device are provided. The method includes forming an alignment layer on a carrier substrate and forming grooves on the alignment layer; providing liquid metal in the grooves, in which the liquid metal includes a plurality of liquid metal structures; applying an electric field parallel to the lengthwise direction x of the groove to the liquid metal to allow each liquid metal structure to be stretched along the lengthwise direction x of the groove to form a rod-like structure and the major-axis direction of each liquid metal structure is parallel to the lengthwise direction x of the groove; obtaining the liquid metal by curing the liquid metal; and stripping off the polarizer from the carrier substrate.

14 Claims, 19 Drawing Sheets

(51) Int. Cl.
  *B22D 25/06* (2006.01)
  *B22D 27/02* (2006.01)
  *B22D 29/00* (2006.01)
  *B29D 11/00* (2006.01)
  *G02F 1/1335* (2006.01)
  *B29K 67/00* (2006.01)
  *B29K 79/00* (2006.01)

(52) U.S. Cl.
  CPC .......... *B29D 11/00644* (2013.01); *G02B 1/14* (2015.01); *G02F 1/133514* (2013.01); *G02F 1/133528* (2013.01); *B29K 2067/003* (2013.01); *B29K 2079/08* (2013.01); *B29K 2995/0005* (2013.01); *G02F 2001/133548* (2013.01)

(56) References Cited

U.S. PATENT DOCUMENTS

2008/0218665 A1* 9/2008 Zhang .................. G02B 5/3058
                                                 349/96
2009/0027773 A1* 1/2009 Kawakami ........... G02B 5/3058
                                                 359/485.05
2012/0287507 A1* 11/2012 Lee ...................... G02B 5/3058
                                                 359/492.01
2013/0106678 A1* 5/2013 Sumi .................. H04N 13/0404
                                                 345/92

FOREIGN PATENT DOCUMENTS

| | | |
|---|---|---|
| CN | 102565909 A | 7/2012 |
| CN | 102854736 A | 1/2013 |
| CN | 103984055 A | 8/2014 |
| CN | 104416159 A | 3/2015 |
| CN | 104849906 A | 8/2015 |
| JP | 2010204297 A | 9/2010 |

OTHER PUBLICATIONS

Apr. 27, 2017—(CN) First Office Action Appn 201510320735.7 with English Tran.

* cited by examiner

POLARIZER, MANUFACTURING METHOD THEREOF AND DISPLAY DEVICE

The application is a U.S. National Phase Entry of International Application No. PCT/CN2015/091654 filed on Oct. 10, 2015, designating the United States of America and claiming priority to Chinese Patent Application No. 201510320735.7, filed on Jun. 11, 2015. The present application claims priority to and the benefit of the above-identified applications and the above-identified applications are incorporated by reference herein in their entirety.

TECHNICAL FIELD

Embodiments of the present disclosure relate to a polarizer, a manufacturing method thereof and a display device.

BACKGROUND

With the continuous development of display technology, display devices are widely applied in the display field. The routine display device is generally a liquid crystal display (LCD).

The LCD generally adopts liquid crystal molecules to cooperate with a polarizer to achieve image display. The polarizer in the LCD includes an upper polarizer and a lower polarizer. The upper polarizer is disposed on a backlight side of an array substrate; the lower polarizer is disposed on a light-emitting side of a color filter (CF) substrate; and a backlight is disposed on one side of the upper polarizer away from the array substrate. When light emitted by the backlight transmits through the upper polarizer, component of which the vibration direction is the same as the polarization direction of the upper polarizer transmits through the upper polarizer, subsequently transmits through the array substrate, a liquid crystal layer and the color filter substrate, and arrives at the lower polarizer; light component arriving at the lower polarizer of which the vibration direction is the same as the polarization direction of the lower polarizer transmits through the lower polarizer and is finally exited from the lower polarizer. The routine polarizer is normally a wire grid polarizer which is formed by a plurality of parallel metal lines on a substrate by coining. The polarization direction of the wire grid polarizer is perpendicular to the lengthwise direction of the metal lines.

SUMMARY

At least one embodiment of the present disclosure provides a manufacturing method thereof and a display device, which utilize technical solutions as below.

Embodiments of the present disclosure provide a method of manufacturing a polarizer, which includes: forming an alignment layer on a carrier substrate and forming grooves on the alignment layer; providing liquid metal in the grooves, in which the liquid metal includes a plurality of liquid metal structures; applying an electric field parallel to the lengthwise direction of the grooves to the liquid metal, to allow each liquid metal structure to be stretched along the lengthwise direction of the grooves to form a rod-like structure and the major-axis direction of each liquid metal structure is parallel to the lengthwise direction of the grooves; obtaining the polarizer by curing the liquid metal; and stripping off the polarizer from the carrier substrate.

In an example, before the step of providing the liquid metal in the grooves, forming a covering layer on a surface of the alignment layer provided with the grooves, to allow channels provided with openings at both ends being formed between the alignment layer and the covering layer; and the step of providing the liquid metal in the grooves includes filling the liquid metal into the channels.

In an example, the step of filling the liquid metal into the channels includes: evacuating the channels; and placing the evacuated substrate provided with the alignment layer and the covering layer into a liquid metal tank containing the liquid metal, and filling the liquid metal in the liquid metal tank into the channels.

In an example, the step of filling the liquid metal into the channels includes: sealing the opening at one end of the channels; evacuating the channels; and filling the liquid metal into the channels from the opening at the other end of the channel by one drop filling (ODF) process.

In an example, the number of the channels is N which is a positive integer greater than or equal to 2, and the N channels are communicated with each other.

The step of filling the liquid metal into the channels include: sealing the openings of the N channels except the first opening which can be any opening among the openings of the N channels; evacuating the N channels; and filling the liquid metal into the channels from the first opening by the ODF process.

In an example, the number of the channels is N which is a positive integer greater than or equal to 2, and the N channels are communicated with each other; and The step of filling the liquid metal into the channels includes: sealing the openings of the N channels except the first opening which can be any opening among the openings of the N channels; evacuating the N channels; and placing the evacuated substrate provided with the alignment layer and the covering layer into a liquid metal tank containing the liquid metal, to allow the liquid metal in the liquid metal tank entering the channels from the first opening and filling the channels.

In an example, after the step of providing the liquid metal in the grooves, forming a protective layer on the covering layer.

In an example, before the step of forming the alignment layer on the carrier substrate and forming the grooves on the alignment layer, forming an indium tin oxide (ITO) electrode on the carrier substrate. The ITO electrode includes a positive electrode and a negative electrode; and the step of forming the alignment layer on the carrier substrate and forming the grooves on the alignment layer includes: forming the alignment layer on the substrate provided with the ITO electrode and forming the grooves on the alignment layer, to allow one end of the grooves being disposed on a corresponding area of the positive electrode on the alignment layer and another end being disposed on a corresponding area of the negative electrode on the alignment layer.

In an example, the step of providing the liquid metal in the grooves includes: transferring the liquid metal into the grooves of the alignment layer by a transfer stencil adsorbed with the liquid metal; and after the step of providing the liquid metal in the grooves, forming an ITO electrode on a surface of the alignment layer provided with the grooves and providing the liquid metal into the grooves. The ITO electrode includes a positive electrode and a negative electrode; the positive electrode corresponds to one end of the grooves; and the negative electrode corresponds to another end of the grooves.

In an example, after the step of curing the liquid metal, stripping off the ITO electrode; forming a covering layer on a surface of the alignment layer provided with the grooves; and forming a protective layer on the covering layer.

In an example, after the step of stripping off the polarizer from the carrier substrate, forming a protective layer on a surface of the alignment layer not provided with the grooves.

In an example, the alignment layer is made from polyimide (PI) materials; and the step of forming the alignment layer on the carrier substrate and forming the grooves on the alignment layer includes: forming the alignment layer on the carrier substrate by the PI materials; and forming the grooves on the alignment layer by a rubbing process or a photo-alignment process.

In an example, the alignment layer is made from inorganic materials; and the step of forming the alignment layer on the carrier substrate and forming the grooves on the alignment layer includes: forming the alignment layer on the carrier substrate by the inorganic materials; and forming the grooves on the alignment layer by a micromachining process.

In an example, the covering layer is a polyethylene terephthalate (PET) film.

In an example, the number of the grooves is N which is a positive integer greater than or equal to 2; and the N grooves are arranged on the alignment layer in an array.

In an example, the liquid metal is an alloy formed by at least two of cesium, gallium, rubidium, potassium, sodium, indium, lithium, tin, bismuth, zinc, antimony, magnesium and aluminum.

Embodiments of the present disclosure provide a polarizer, which includes an alignment layer, on which grooves are formed; liquid metal is formed in the grooves and includes a plurality of liquid metal structures; each liquid metal structure is a rod-like structure; and the major-axis direction of each liquid metal structure is parallel to the lengthwise direction of the grooves.

In an example, a surface of the alignment layer provided with the grooves is formed with a covering layer; and the covering layer and a surface of the alignment layer not provided with the grooves are formed with a protective layer.

In an example, the alignment layer is made from PI materials or inorganic materials; and the covering layer is a PET film.

In an example, the number of the grooves is N which is a positive integer greater than or equal to 2; and the N grooves are arranged on the alignment layer in an array.

In an example, the liquid metal is an alloy formed by at least two of cesium, gallium, rubidium, potassium, sodium, indium, lithium, tin, bismuth, zinc, antimony, magnesium and aluminum.

Embodiments of the present disclosure provide a display device, which includes: an array substrate and a color filter (CF) substrate assembled together, and a liquid crystal layer filled between the array substrate and the CF substrate. An upper polarizer is disposed on a backlight side of the array substrate. A lower polarizer is disposed on a side of the CF substrate away from the array substrate. The upper polarizer and/or the lower polarizer is the polarizer as provided above or any examples as stated above.

In an example, the display device includes a backlight, the backlight being disposed on a side of the upper polarizer away from the array substrate.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which:

FIG. 6-1 is a flowchart of another method of manufacturing a polarizer, provided by an embodiment of the present disclosure;

FIG. 6-2 is a schematic structural view of a polarizer obtained after the step of forming an ITO electrode on a carrier substrate, provided by the embodiment as shown in FIG. 6-1;

FIG. 6-3 is a top view of the polarizer obtained after the step of forming the ITO electrode on the carrier substrate, provided by the embodiment as shown in FIG. 6-1;

FIG. 6-4 is a top view of another polarizer obtained after the step of forming ITO electrodes on a carrier substrate, provided by the embodiment as shown in FIG. 6-1;

FIG. 6-5 is a schematic structural view of a polarizer obtained after the step of forming an alignment layer on the substrate provided with the ITO electrode, provided by the embodiment as shown in FIG. 6-1;

FIG. 6-6 is a top view of the polarizer obtained after the step of forming the alignment layer on the substrate provided with the ITO electrode, provided by the embodiment as shown in FIG. 6-1;

FIG. 6-7 is a top view of another polarizer obtained after the step of forming an alignment layer on the substrate provided with the ITO electrode, provided by the embodiment as shown in FIG. 6-1;

FIG. 6-8 is a schematic structural view of a polarizer obtained after the step of forming a covering layer on a surface of the alignment layer provided with grooves, provided by the embodiment as shown in FIG. 6-1;

FIG. 6-9 is a schematic structural view of a polarizer obtained after the step of filling liquid metal into the grooves, provided by the embodiment as shown in FIG. 6-1;

FIG. 6-10 is a flowchart of a process of filling liquid metal into grooves, provided by the embodiment as shown in FIG. 6-1;

FIG. 6-11 is a flowchart of another process of filling liquid metal into grooves, provided by the embodiment as shown in FIG. 6-1;

FIG. 6-12 is a flowchart of still another process of filling liquid metal into grooves, provided by the embodiment as shown in FIG. 6-1;

FIG. 6-13 is a flowchart of still yet another process of filling liquid metal into grooves, provided by the embodiment as shown in FIG. 6-1;

FIG. 6-14 is a schematic structural view of a polarizer obtained after the step of forming a protective layer on the covering layer, provided by the embodiment as shown in FIG. 6-1;

FIG. 6-15 is a schematic structural view of a polarizer obtained after the step of stripping off the carrier substrate, provided by the embodiment as shown in FIG. 6-1;

FIG. 6-16 is a schematic structural view of a polarizer obtained after the step of forming a protective layer on a surface of the alignment layer not provided with grooves, provided by the embodiment as shown in FIG. 6-1;

FIG. 7-1 is a flowchart of still another method of manufacturing a polarizer, provided by the embodiment of the present disclosure;

FIG. 7-2 is a schematic structural view of a polarizer obtained after the step of forming an alignment layer on a carrier substrate, provided by the embodiment as shown in FIG. 7-1;

FIG. 7-3 is a schematic structural view of a polarizer obtained after the step of providing liquidmetal in grooves, provided by the embodiment as shown in FIG. 7-1;

FIG. 7-4 is a schematic structural view of a polarizer obtained after the step of forming an ITO electrode on a surface of the alignment layer provided with the grooves, provided by the embodiment as shown in FIG. 7-1;

FIG. 7-5 is a schematic structural view of a polarizer obtained after the step of forming a covering layer on a surface of the alignment layer provided with the grooves, provided by the embodiment as shown in FIG. 7-1;

FIG. 8 is a schematic structural view of a display device provided by an embodiment of the present disclosure; and FIG. 9 is a schematic structural view of another display device provided by an embodiment of the present disclosure.

DETAILED DESCRIPTION

Figure 1:
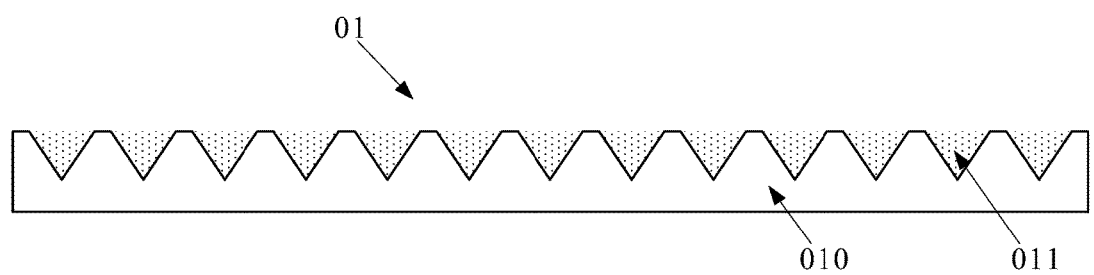
FIG. 1 is a schematic structural view of a polarizer provided by an embodiment of the present disclosure.

Technical solutions of the embodiment will be described in a clearly and fully understandable way in connection with the drawings related to the embodiments of the present disclosure. It is apparent that the described embodiments are just a part but not all of the embodiments of the present disclosure. Based on the described embodiments herein, one of ordinary skill in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. Also, the terms, such as "a/an," "the" or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

The inventors found that when a wire grid polarizer is formed by a coining process, the parallelism of metal lines is difficult to control, so that the polarization direction of the polarizer is difficult to control, and the yield of the wire grid polarizer is very low.

Further detailed description will be given below to the exemplary embodiments of the present disclosure with reference to the accompanying drawings.

Simple description will be given to liquid metal involved in the embodiments of the present disclosure before detailed description on the embodiments of the present disclosure is given.

Liquid metal refers to an amorphous metal and can be seen as a mixture of positive ion fluid and free electrons. Liquid metal is generally in the liquid state at room temperature (20 to 25 Celsius degrees). When the ambient temperature is a temperature (e.g., below 20 Celsius degrees) below the room temperature, the liquid metal may be in solid state. The liquid metal has a universal deformation capacity of converting between different states and motion modes. For example, liquid metal structures of a liquid metal immersed into water may reveal abilities, such as large-scale deformation, spin, directional movement and self-rotation, at a certain voltage, and the liquid metal structures can be fused together, fracture from each other, refused together, or the like. These properties of the liquid metal may be utilized to form liquid metal patterns, or the like. More uniquely, a large liquid metal film may be shrunk into a single liquid metal ball in a few seconds, and the deformation process is very fast. In addition, under the action of an electric filed, a large number of separate liquid metal balls may be adhered and merged until being fused into a single liquid metal ball. Under the action of a predetermined electric field, the liquid metal structures can readily achieve a high-speed spin motion and induce ambient liquid metal structures to spin fast, to form swirl pairs in rapid spin state. If the electric field is adjusted appropriately, the liquid metal structures may also move quickly in a predetermined direction.

FIG. 1 is a schematic structural view of a polarizer 01 provided by an embodiment of the present disclosure. The polarizer 01 includes an alignment layer 010, in which grooves (not marked in FIG. 1) are formed on the alignment layer 010; and liquid metal 011 is formed in the grooves. The liquid metal includes a plurality of liquid metal structures; each liquid metal structure is a rod-like structure; and the major-axis direction of each liquid metal structure is parallel to the lengthwise direction of the grooves. The grooves as shown in FIG. 1 are only illustrative and the size and the scale thereof do not represent true size and scale. For instance, the structure of the grooves may be a microstructure, and the width of the grooves may be in a nanoscale.

In an embodiment of the present disclosure, in an instance that the polarization direction of incident light is parallel to the lengthwise direction of the grooves, free electrons in the liquid metal disposed in the grooves are going to directional move along the lengthwise direction under the action of an external electric field. As the length of the grooves is much longer than the wavelength of the incident light, it is equivalent that polarized light of the incident light applied to a surface of a metal film and along the lengthwise direction of the grooves is reflected. To the contrary, in an instance that the polarization direction of the incident light is perpendicular to the lengthwise direction of the grooves, as the width of the grooves are only about one-third to one-quarter of the wavelength of the incident light, the motion of the free electrons is severely restricted and the free electrons cannot have useful effect with the incident light, so the incident light is not reflected and refracted but transmitted.

As stated, in the polarizer provided by the embodiment of the present disclosure, as the grooves are formed on the alignment layer and the liquid metal is formed in the grooves, the major-axis direction of the liquid metal structure is parallel to the lengthwise direction of the grooves and the minor-axis direction of the liquid metal structure is the polarization direction of the polarizer. In the embodiment of the present disclosure, the liquid metal is adopted to achieve the polarization direction of the polarizer, to allow the polarization direction of the polarizer to be readily controlled and the yield of the polarizer can be higher.

Figure 2:
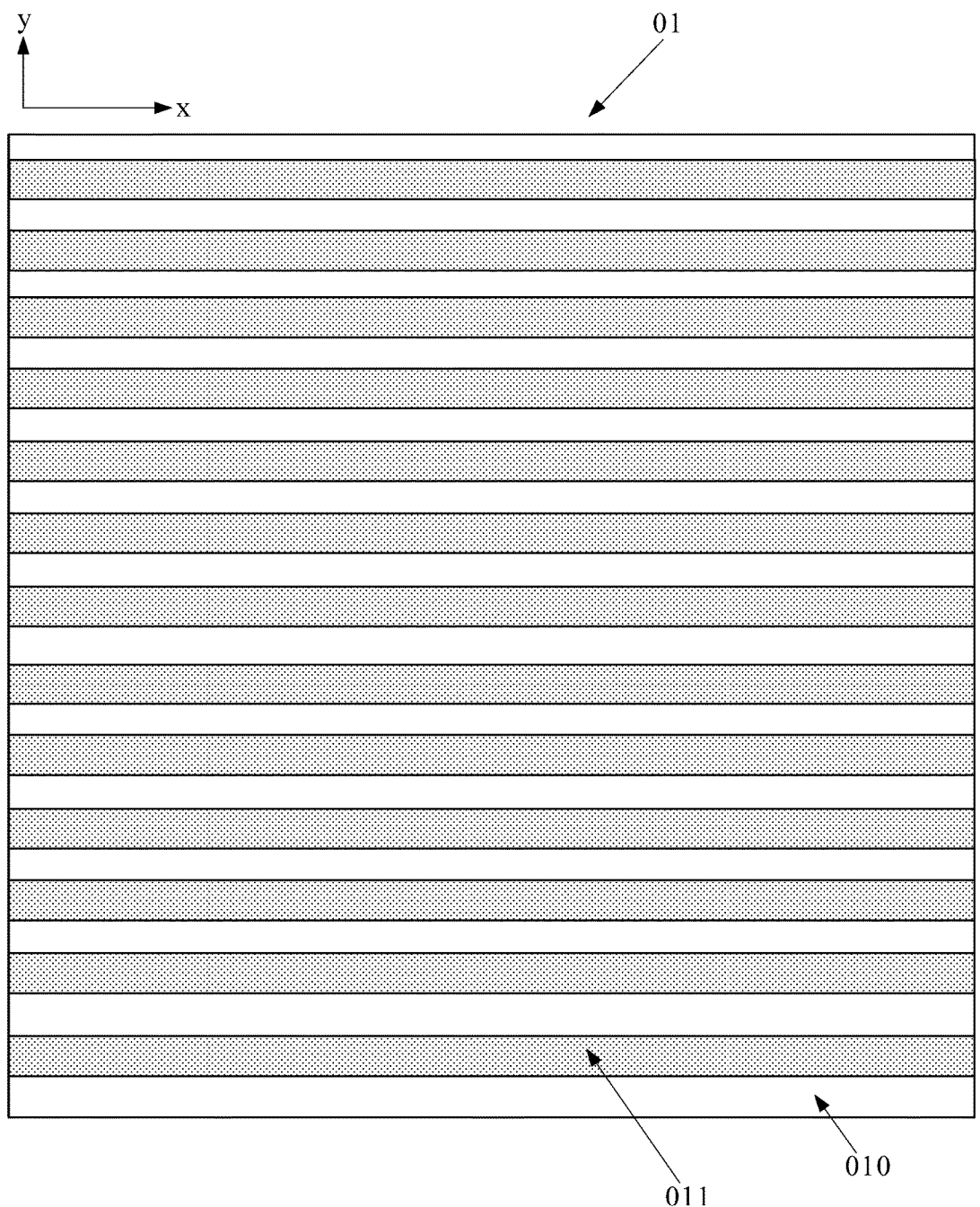
FIG. 2 is a top view of the polarizer provided by the embodiment of the present disclosure as shown in FIG. 1.

The shape of the alignment layer 010 may be set according to circumstances. Exemplarily, FIG. 2 is a top view of the polarizer 01 provided by the embodiment as shown in FIG. 1. As illustrated in FIG. 2, an upper surface of the alignment layer 010 may be a rectangular-shaped. The lengthwise direction of the alignment layer 010 is the x direction and the transverse direction is the y direction. N grooves are formed on the alignment layer 010 and liquid metal 011 is formed in each groove. N is a positive integer greater than or equal to 2. The N grooves are arranged on the alignment layer 010 in an array along the transverse direction y of the alignment layer 010. The lengthwise direction of each groove is parallel to the lengthwise direction x of the alignment layer 010. The transverse direction of each groove is parallel to the transverse direction y of the alignment layer 010. The N value may be set according to actual conditions. The liquid metal 011 may be an alloy formed by at least two of cesium, gallium, rubidium, potassium, sodium, indium, lithium, tin, bismuth, zinc, antimony, magnesium and aluminum.

Figure 3:
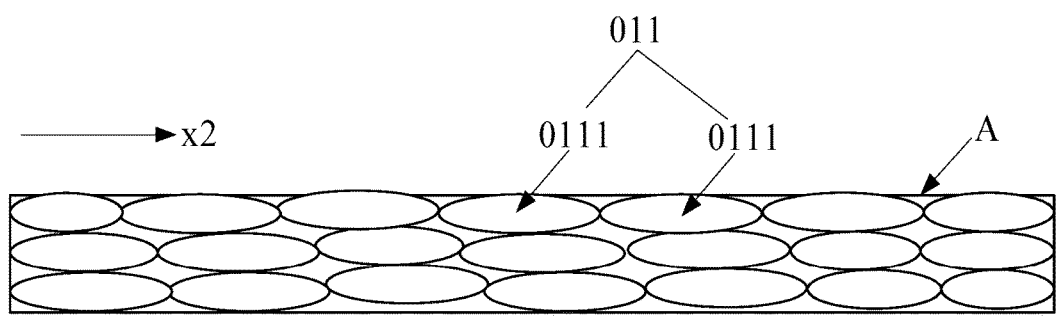
FIG. 3 is an enlarged view of a groove as shown in FIG. 2 and liquid metal formed in the groove.

Optionally, refer to FIG. 3, liquid metal 011 is formed in a groove A and includes a plurality of liquid metal structures 0111. Each liquid metal structure 0111 is a rod-like structure. The major-axis direction of each liquid metal structure 0111 is parallel to the lengthwise direction x2 of the groove A. The liquid metal structure 0111 having a rod-like structure is a 3D structure having a major axis and a minor axis. In an instance that the major axis of the liquid metal structure 0111 having a rod-like structure is parallel to the lengthwise direction of the groove A, the minor axis thereof is perpendicular to the lengthwise direction of the groove A. In the embodiment of the present disclosure, the minor-axis direction of the liquid metal 0111 is the polarization direction of the polarizer, namely the direction perpendicular to the lengthwise direction of the groove is the polarization direction of the polarizer. It is noted that each liquid metal structure 0111 may be formed by a plurality of liquid metal molecules in the embodiment of the present disclosure. But the embodiments of the present disclosure are not limited thereto.

Figure 4:
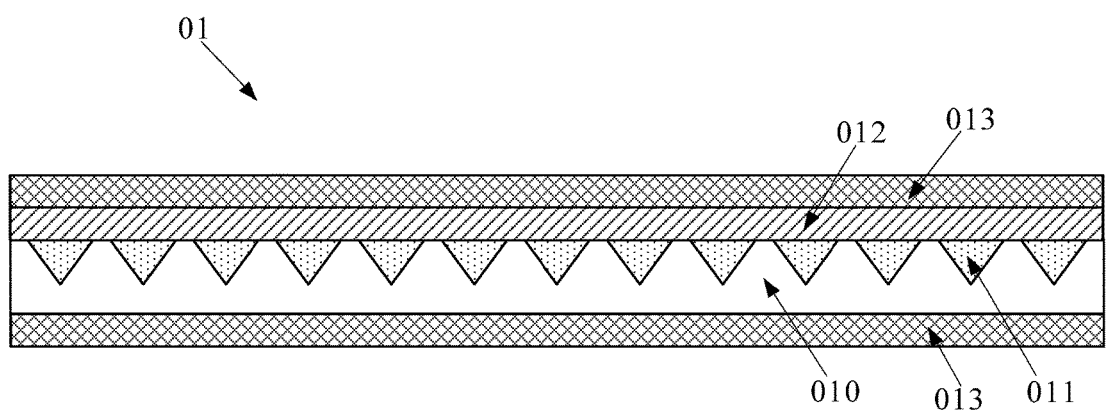
FIG. 4 is a schematic structural view of another polarizer provided by an embodiment of the present disclosure.

FIG. 4 is a schematic structural view of another polarizer 01 provided by an embodiment of the present disclosure. As illustrated in FIG. 4, the polarizer 01 includes an alignment layer 010, and grooves are formed on the alignment layer 010. The liquid metal 011 is formed in the grooves and includes a plurality of liquid metal structures, and each liquid metal structure is a rod-like structure. The major-axis direction of each liquid metal structure is parallel to the lengthwise direction of the grooves. The grooves as shown in FIG. 4 are only illustrative and the size and the scale thereof do not represent true size and scale. For instance, the structure of the grooves may be a microstructure, and the width of the grooves may be in nanoscale.

As illustrated in FIG. 4, a covering layer 012 is formed on a surface of the alignment layer 010 provided with the grooves; and a protective layer 013 is formed on both the covering layer 012 and a surface of the alignment layer 010 not provided with the grooves.

Optionally, the alignment layer 010 may be made from Polyimide (PI) materials or inorganic materials. In an instance that the alignment layer 010 is made from the PI materials, the forming process may be as follows: depositing a layer of PI materials with certain thickness on the carrier substrate by coating, magnetron sputtering, thermal evaporation or plasma-enhanced chemical vapor deposition (PECVD); obtaining the alignment layer 010 by curing the PI materials; then aligning the alignment layer 010 by a rubbing process or a photo-alignment process; and forming grooves on the alignment layer 010. In an instance that the alignment layer 010 is made from the inorganic materials, the forming process may be as follows: depositing a layer of inorganic materials with certain thickness on the carrier substrate by coating, magnetron sputtering, thermal evaporation or PECVD; obtaining the alignment layer 010 by curing the inorganic materials; aligning the alignment layer 010 by micromachining process; and forming grooves on the alignment layer 010. The micromachining process is, for instance, nanoimprint lithography process or micro-electromechanical system (MEMS) process. It is noted that description is given in the embodiment of the present disclosure by taking the case that the alignment layer 010 is made from PI materials or inorganic materials as an example. But the embodiments of the present disclosure are not limited thereto. For instance, the alignment layer 010 may also be made from other materials.

Optionally, the covering layer 012 is a polyethylene terephthalate (PET) film and may be adhered to a surface of the alignment layer 010 provided with the grooves by bonding. It is noted that description is given in the embodiment of the present disclosure by taking the case that the covering layer 012 is a PET film as an example. But the embodiments of the present disclosure are not limited thereto. For instance, the covering layer 012 may also be made from other materials, not limited to the PET film.

Optionally, the protective layer 013 may be made from silicide. Exemplarily, silicide with certain thickness is deposited on both the covering layer 012 and the surface of the alignment layer 010 not provided with the grooves by coating, magnetron sputtering, thermal evaporation or PECVD, and taken as the protective layer 013. The protective layer 013 may be formed by oxide, nitride or oxynitride, and corresponding reaction gas may be a mixed gas of $SiH_4$, $NH_3$ and $N_2$ or a mixed gas of $SiH_2Cl_2$, $NH_3$ and $N_2$. It is noted that description is given in the embodiment of the present disclosure by taking the case that the protective layer 013 is made from silicide as an example. But the embodiments of the present disclosure are not limited thereto. For instance, the protective layer 013 may also be made from other materials.

In the embodiment of the present disclosure, in an instance that the polarization direction of incident light is parallel to the lengthwise direction of the grooves, free electrons in the liquid metal disposed in the grooves are subjected to directional movement along the lengthwise direction of the grooves under the action of an external electric field. As the length of the grooves is much longer than the wavelength of the incident light, it is equivalent that polarized light of the incident light applied to a surface of a metal film and along the lengthwise direction of the groove is reflected. To the contrary, in an instance that the polarization direction of the incident light is perpendicular to the lengthwise direction of the grooves, as the width of the grooves is only about one-third to one-quarter of the wavelength of the incident light, the motion of the free electrons is severely restricted and the free electrons cannot have useful effect with the incident light, so the incident light is not reflected and refracted but transmitted.

In the polarizer provided by the embodiment of the present disclosure, as the grooves are formed on the alignment layer and the liquid metal is formed in the grooves, the major-axis direction of the liquid metal structure is parallel to the lengthwise direction of the grooves and the minor-axis direction of the liquid metal structure is the polarization direction of the polarizer. In the embodiment of the present disclosure, the liquid metal is adopted to achieve the polarization direction of the polarizer, so that the polarization direction of the polarizer can be readily controlled and the yield of the polarizer can be higher.

Figure 5:
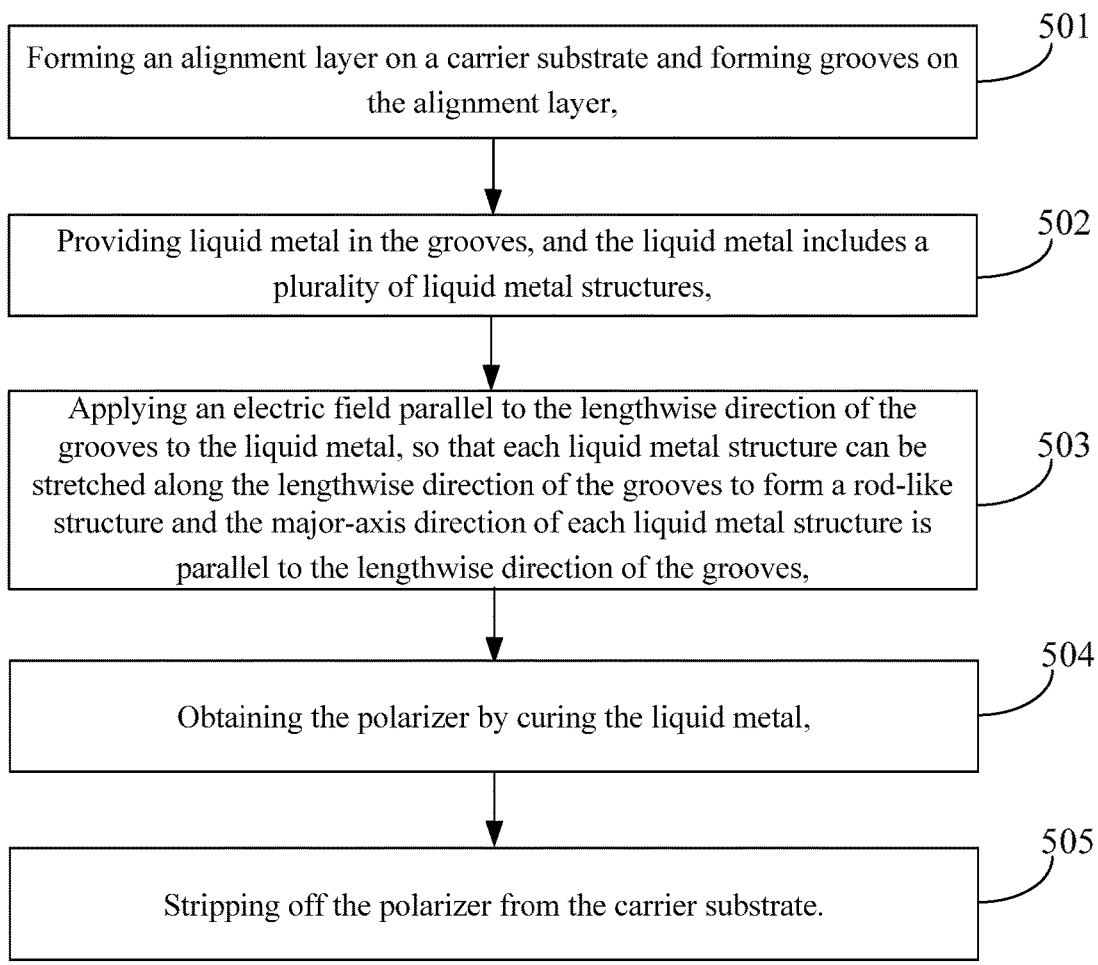
FIG. 5 is a flowchart of a method of manufacturing a polarizer, provided by an embodiment of the present disclosure.

FIG. 5 is a flowchart of a method of manufacturing a polarizer, provided by an embodiment of the present disclosure. The method of manufacturing the polarizer may be used for manufacturing the polarizer 01 as shown in FIG. 1 or 4. As illustrated in FIG. 5, the method of manufacturing the polarizer may include the following steps.

S501: forming an alignment layer on a carrier substrate and forming grooves on the alignment layer;

S502: providing liquid metal in the grooves, in which the liquid metal includes a plurality of liquid metal structures;

S503: applying an electric field parallel to the lengthwise direction of the grooves to the liquid metal, so that each liquid metal structure can be stretched along the lengthwise direction of the groove to form a rod-like structure and the major-axis direction of each liquid metal structure is parallel to the lengthwise direction of the groove;

S504: obtaining the polarizer by curing the liquid metal; and

S505: stripping off the polarizer from the carrier substrate.

In the embodiment of the present disclosure, in an instance that the polarization direction of the incident light is parallel to the lengthwise direction of the grooves, free electrons in the liquid metal disposed in the grooves are subjected to directional movement along the lengthwise direction of the groove under the action of an external electric field. As the length of the grooves is much longer than the wavelength of the incident light, it is equivalent that polarized light of the incident light applied to a surface of a metal film and along the lengthwise direction of the groove is reflected. To the contrary, in an instance that the polarization direction of the incident light is perpendicular to the lengthwise direction of the grooves, as the width of the grooves is only about one-third to one-quarter of the wavelength of the incident light, the motion of the free electrons is severely restricted and the free electrons cannot have useful effect with the incident light, so the incident light is not reflected and refracted but transmitted.

In the method of manufacturing the polarizer, provided by the embodiment of the present disclosure, the alignment layer is formed on the carrier substrate and the grooves are formed on the alignment layer; the liquid metal is formed in the grooves; the electric field parallel to the lengthwise direction of the grooves is applied to the liquid metal, so that the liquid metal structure can be stretched along the lengthwise direction of the grooves to form rod-like structure and the major-axis direction of the liquid metal structure is parallel to the lengthwise direction of the grooves; subsequently, the liquid metal is cured to obtain the polarizer; and the polarizer is stripped off from the carrier substrate. The major-axis direction of the liquid metal structure is parallel to the lengthwise direction of the grooves, and the minor-axis direction of the liquid metal structure is the polarization direction of the polarizer. In the embodiment of the present disclosure, the liquid metal is adopted to achieve the polarization direction of the polarizer, so that the polarization direction of the polarizer can be readily controlled and the yield of the polarizer can be higher.

Optionally, before the step S502, a covering layer is formed on a surface of the alignment layer provided with the grooves, so that channels provided with openings at both ends can be formed between the alignment layer and the covering layer.

The step S502 may include filling the liquid metal into the channels.

Optionally, the step S502 may include evacuating the channels; and placing the evacuated substrate provided with the alignment layer and the covering layer into a liquid metal tank containing the liquid metal, and filling the liquid metal in the liquid metal tank into the channels.

Optionally, the step S502 includes sealing the opening at one end of the channel; evacuating the channel; and filling the liquid metal into the channel from the opening at the other end of the channel by one drop filling (ODF).

Optionally, the number of the channels is N, which is a positive integer greater than or equal to 2, and the N channels are communicated with each other.

The step S502 may further include: sealing the openings of the N channels except the first opening which may be any opening among the openings of the N channels; evacuating the N channels; and filling the liquid metal into the channels from the first opening by ODF.

Optionally, the number of the channels is N, which is a positive integer greater than or equal to 2, and the N channels are communicated with each other.

The step S502 further includes: sealing the openings of the N channels except the first opening which may be any opening among the openings of the N channels; evacuating the N channels; and placing the evacuated substrate provided with the alignment layer and the covering layer into a liquid metal tank containing the liquid metal, so that the liquid metal in the liquid metal tank can enter the channels from the first opening and be filled into the channels.

Optionally, after the step S502, the method includes forming a protective layer on the covering layer.

Optionally, before the step S502, the method includes forming an Indium Tin Oxide (ITO) electrode on the carrier substrate, in which the ITO electrode includes a positive electrode and a negative electrode.

The step S501 includes forming the alignment layer on the substrate provided with the ITO electrode and forming the grooves on the alignment layer, in which one end of each groove is disposed on a corresponding area of the positive electrode on the alignment layer, and another end of the groove is disposed on a corresponding area of the negative electrode on the alignment layer.

Optionally, the step S502 includes transferring the liquid metal into the grooves of the alignment layer by a transfer stencil adsorbed with the liquid metal.

After the step S502, an Indium Tin Oxide (ITO) electrode is formed on a surface of the alignment layer provided with the grooves; the liquid metal is formed in the grooves; the ITO electrode includes a positive electrode and a negative electrode; the positive electrode corresponds to one end of each groove; and the negative electrode corresponds another end of the groove.

Optionally, after the step S504, the method includes stripping off the ITO electrode; forming a covering layer on a surface of the alignment layer provided with the grooves; and forming a protective layer on the covering layer.

Optionally, after the step S505, the method includes forming a protective layer on a surface of the alignment layer not provided with the grooves.

Optionally, the alignment layer is made from Polyimide (PI) materials, and the step S501 includes forming the alignment layer on the carrier substrate by the PI materials; and forming the grooves on the alignment layer by a rubbing process or a photo-alignment process.

Optionally, the alignment layer is made from inorganic materials, and the step S501 includes forming the alignment layer on the carrier substrate by the inorganic materials; and forming the grooves on the alignment layer by a micromachining process.

Optionally, the covering layer is a polyethylene terephthalate (PET) film.

Optionally, the number of the grooves is N, which is a positive integer greater than or equal to 2; and the N grooves are arranged on the alignment layer in an array.

Optionally, the liquid metal is an alloy formed by at least two of cesium, gallium, rubidium, potassium, sodium, indium, lithium, tin, bismuth, zinc, antimony, magnesium and aluminum.

Any of the optional technical solutions may be combined to form selectable embodiments of the present disclosure. No further description will be given here in details.

In the embodiment of the present disclosure, in an instance that the polarization direction of incident light is parallel to the lengthwise direction of the grooves, free electrons in the liquid metal disposed in the grooves are subjected to directional movement along the lengthwise direction of the grooves under the action of an external electric field. As the length of the grooves is much longer than the wavelength of the incident light, it is equivalent that polarized light of the incident light applied to a surface of a metal film and along the lengthwise direction of the grooves is reflected. To the contrary, in an instance that the polarization direction of the incident light is perpendicular to the lengthwise direction of the grooves, as the width of the grooves is only about one-third to one-quarter of the wavelength of the incident light, the motion of the free electrons is severely restricted and the free electrons cannot have useful effect with the incident light, so the incident light is not reflected and refracted but transmitted.

As stated above, in the method of manufacturing the polarizer, provided by the embodiment of the present disclosure, the alignment layer is formed on the carrier substrate and the grooves are formed on the alignment layer; the liquid metal is formed in the grooves; the electric field parallel to the lengthwise direction of the grooves is applied to the liquid metal, so that the liquid metal structure can be stretched along the lengthwise direction of the grooves to form a rod-like structure and the major-axis direction of the liquid metal structure is parallel to the lengthwise direction of the grooves; subsequently, the liquid metal is cured to obtain the polarizer; and the polarizer is stripped off from the carrier substrate. The major-axis direction of the liquid metal structure is parallel to the lengthwise direction of the grooves, and the minor-axis direction of the liquid metal structure is the polarization direction of the polarizer. In the embodiment of the present disclosure, the liquid metal is adopted to achieve the polarization direction of the polarizer, so that the polarization direction of the polarizer can be readily controlled and the yield of the polarizer can be higher.

Figures 1, 6:
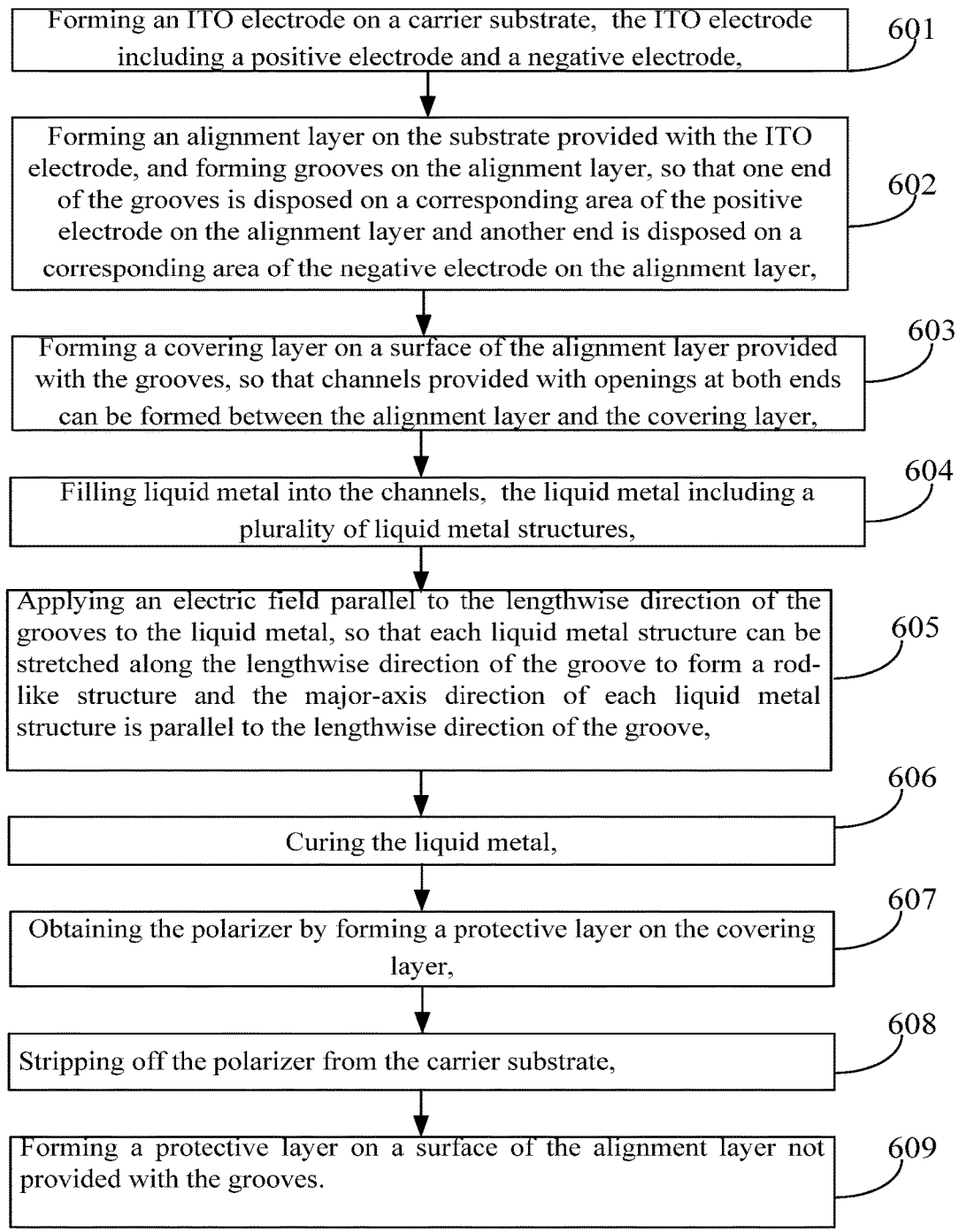
Figures 2, 6:
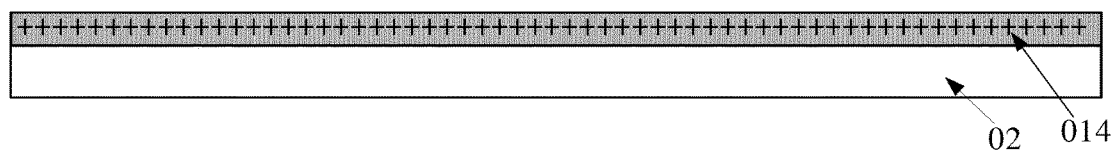
Figures 3, 6:
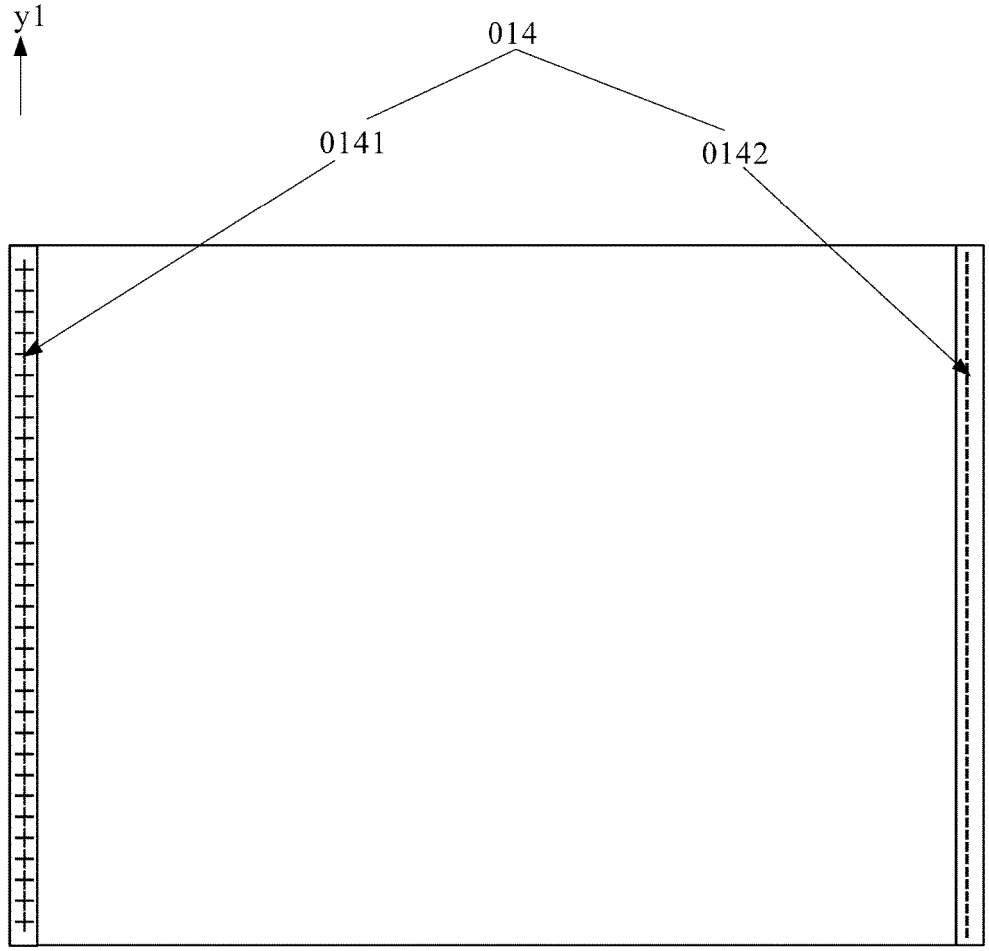
Figures 4, 6:
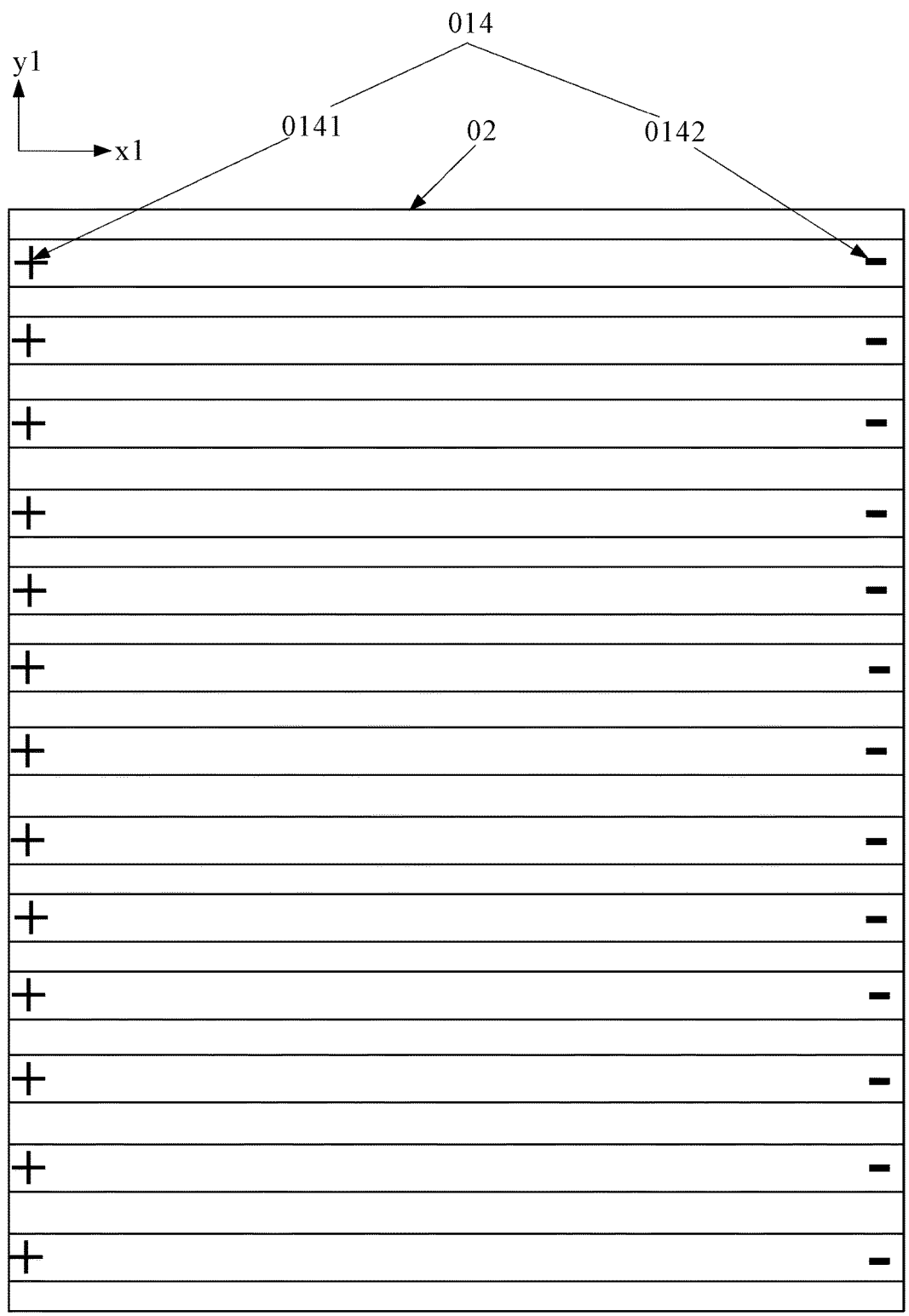
Figures 5, 6:
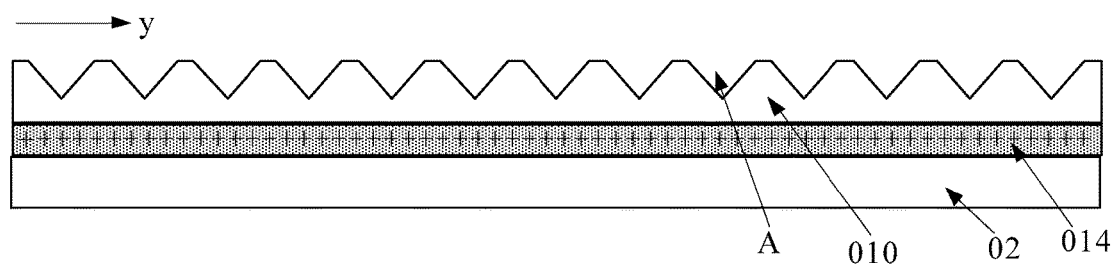
Figure 6:
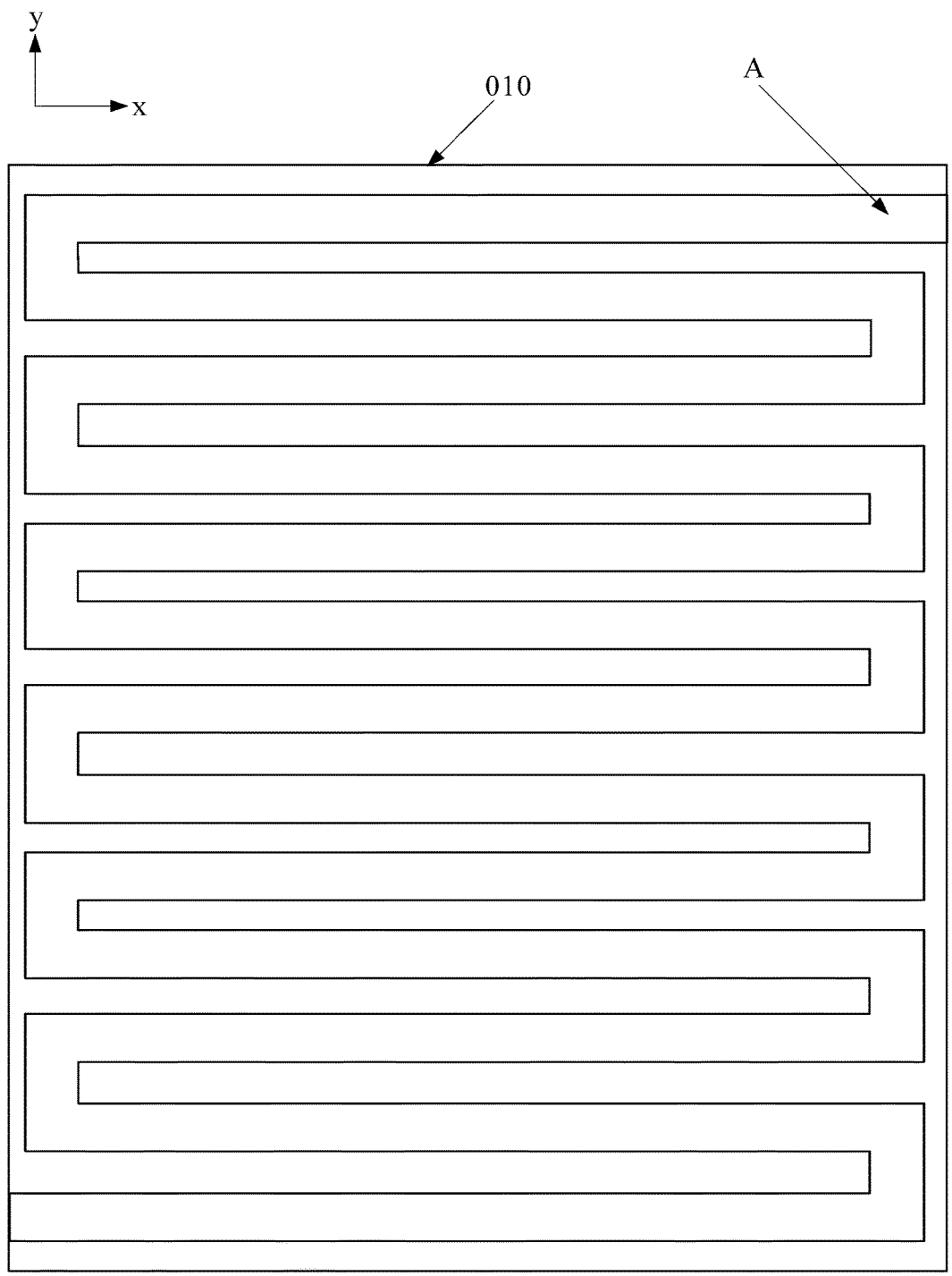

FIG. 6-1 is a flowchart of another method of manufacturing polarizer, provided by an embodiment of the present disclosure. The method of manufacturing polarizer may be used for manufacturing the polarizer 01 as shown in FIG. 1 or 4. As illustrated in FIG. 6-1, the method of manufacturing the polarizer may include the following steps.

S601: forming an ITO electrode on a carrier substrate, in which the ITO electrode includes a positive electrode and a negative electrode.

The carrier substrate may be a transparent substrate, for instance, may be a substrate which is made from light guide nonmetallic materials with certain firmness, such as glass, quartz and transparent resin, and an upper surface of the carrier substrate is generally rectangular.

FIG. 6-2 is a schematic structural view of a polarizer obtained after the step of forming an ITO electrode 014 on a carrier substrate 02. Description is given in the embodiment of the present disclosure by taking the case that the upper surface of the carrier substrate 02 is rectangular as an example. As illustrated in FIG. 6-2, optionally, the ITO electrode 014 may be formed on the entire upper surface of the carrier substrate 02, or N strip ITO electrodes 014 arranged in an array may be formed on the upper surface of the carrier substrate 02 along the transverse direction y1 of the carrier substrate 02, so that the lengthwise direction of each strip ITO electrode 014 is parallel to the lengthwise direction of the carrier substrate 02, where N is a positive integer greater than or equal to 2. The N value may be set according to actual conditions. The embodiments of the present disclosure are not limited thereto. Description is given in an embodiment of the present disclosure by taking the case that the ITO electrode 014 is formed on the entire upper surface of the carrier substrate 02 as an example.

As illustrated in FIG. 6-3 which is a top view of the polarizer obtained after the step of forming the ITO electrode 014 on the carrier substrate 02, provided by the embodiment as shown in FIG. 6-1, the upper surface of the carrier substrate is rectangular; the transverse direction is y1; the ITO electrode 014 is formed on the entire upper surface of the carrier substrate; and an upper surface of the ITO electrode 014 is a rectangle, which is the same as the upper surface of the carrier substrate 02. The case that the upper surface of the ITO electrode 014 is the same as the upper surface of the carrier substrate 02 refers to that the shape of the upper surface of the ITO electrode 014 is the same as the shape of the upper surface of the carrier substrate 02, and the area of the upper surface of the ITO electrode 014 is the same as the area of the upper surface of the carrier substrate 02. The ITO electrode 014 includes a positive electrode 0141 and a negative electrode 0142. As illustrated in FIG. 6-3, the positive electrode 0141 is close to a short side of the carrier substrate, and the negative electrode 0142 is close to another short side of the carrier substrate. Both the positive electrode 0141 and the negative electrode 0142 may be a strip structure, and the lengthwise direction of the positive electrode 0141 and the negative electrode 0142 is parallel to the transverse direction y1 of the carrier substrate. It is noted that the position of the positive electrode 0141 and the position of the negative electrode 0142 may be exchanged in the embodiments of the present disclosure. The embodiments of the present disclosure are not limited thereto.

For instance, the process of forming the ITO electrode 014 as shown in FIG. 6-3 may include depositing an ITO film with certain thickness on the carrier substrate 02 by coating, magnetron sputtering, thermal evaporation or PECVD process, and subsequently forming the ITO electrode 014 by processing the ITO film. The forming process of the positive electrode 0141 and the negative electrode 0142 may adopt the routine process. No further description will be given herein.

It is noted that description is given in the embodiment of the present disclosure by taking the case that the ITO electrode 014 is formed on the entire surface of the carrier substrate 02 as an example. For instance, N strip ITO electrodes 014 arranged in an array may also be formed on the upper surface of the carrier substrate 02 along the transverse direction y1 of the carrier substrate 02, and the lengthwise direction of each strip ITO electrode 014 is parallel to the lengthwise direction of the carrier substrate 02. Exemplarily, as shown in FIG. 6-4 which is a top view of another polarizer obtained after the step of forming ITO electrodes 014 on the carrier substrate 02, provided by the embodiment as shown in FIG. 6-1, the upper surface of the carrier substrate 02 is rectangular; the carrier substrate 02 has the transverse direction y1 and the lengthwise direction x1; N strip ITO electrodes 014 arranged in an array are formed on the upper surface of the carrier substrate 02 along the transverse direction y1 of the carrier substrate 02; and the lengthwise direction of each strip ITO electrode 014 is parallel to the lengthwise direction x1 of the carrier substrate 02. In FIG. 6-4, N is 13, which is only illustrative. But the embodiments of the present disclosure are not limited thereto. For instance, N may adopt other numbers.

For instance, the process of forming the ITO electrodes 014 as shown in FIG. 6-4 may include depositing an ITO film with certain thickness on the carrier substrate 02 by coating, sputtering, thermal evaporation or PECVD; performing an exposure process on the ITO film via a mask to form a fully exposed area and a non-exposed area; processing the obtained product by a developing process, so that the ITO film in the fully exposed area is completely removed and the ITO film at the non-exposed area is completely retained; and forming the ITO electrodes 014 after roasting. Each ITO electrode 014 includes a positive electrode 0141 and a negative electrode 0142. The forming process of the positive electrode 0141 and the negative electrode 0142 may adopt a routine process. No further description will be given herein.

S602: forming an alignment layer on the substrate provided with the ITO electrodes, and forming grooves on the alignment layer, so that one end of each groove is disposed on a corresponding area of each positive electrode on the alignment layer and another end of the groove is disposed on a corresponding area of the negative electrode on the alignment layer.

FIG. 6-5 is a schematic structural view of a polarizer obtained after the step of forming an alignment layer 010 on the substrate provided with the ITO electrode 014. An upper surface of the alignment layer 010 may be a rectangle, which is the same as the upper surface of the carrier substrate 02. As illustrated in FIG. 6-5, the transverse direction of the alignment layer 010 may be the y direction, and the transverse direction y of the alignment layer 010 is parallel to the transverse direction y1 of the carrier substrate 02. The fact that the upper surface of the alignment layer 010 is the same as the upper surface of the carrier substrate 02 refers to that the shape of the upper surface of the alignment layer 010 is the same as the shape of the upper surface of the carrier substrate 02, and the area of the upper surface of the alignment layer 010 is the same as the area of the upper surface of the carrier substrate 02.

Figures 6, 7:
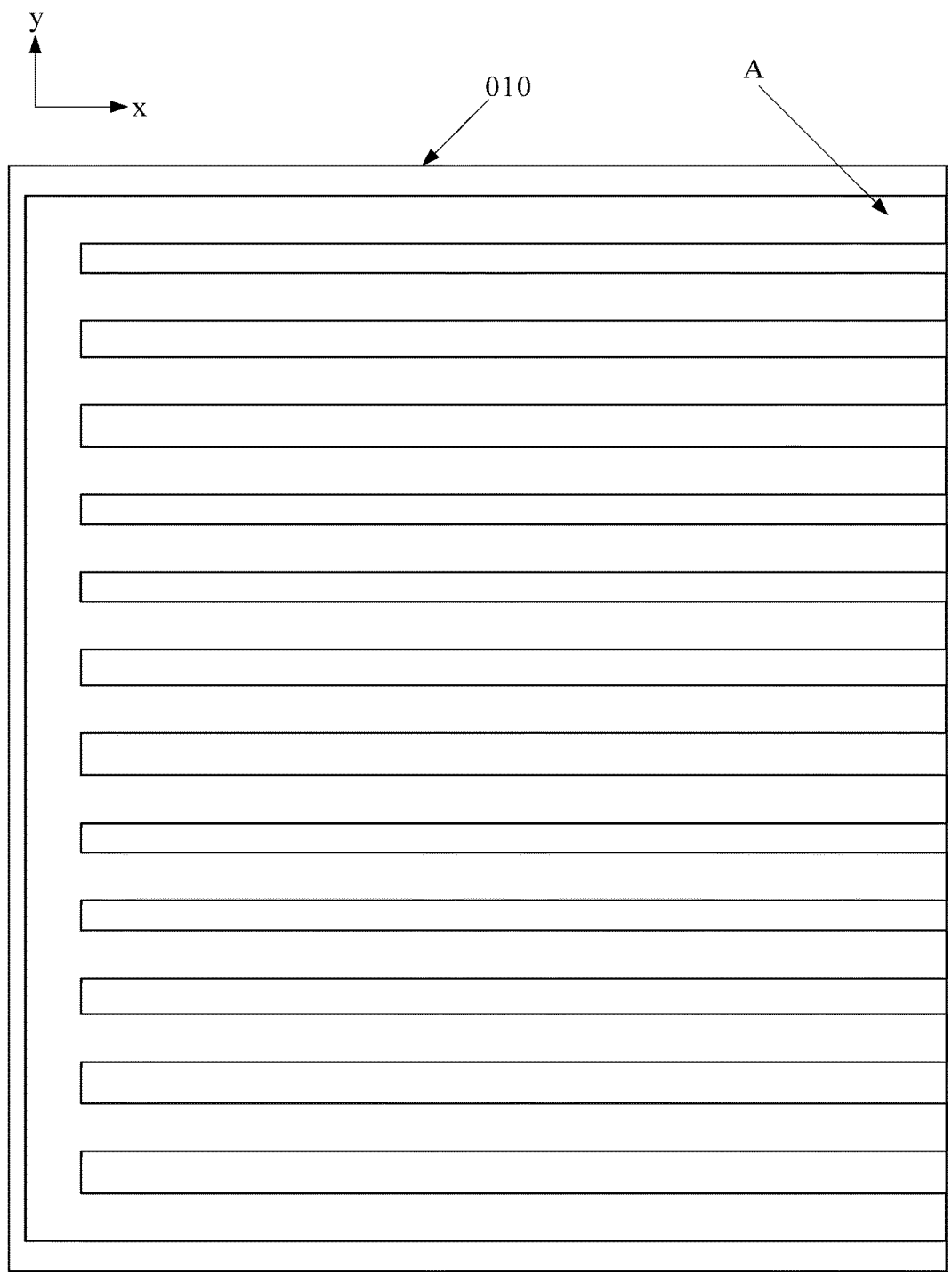

As illustrated in FIG. 6-6 which is a top view of the polarizer obtained after the step of forming the alignment layer 010 on the substrate provided with the ITO electrode 014, provided by the embodiment as shown in FIG. 6-1, an upper surface of the alignment layer 010 is rectangular; the alignment layer 010 has the lengthwise direction x and the transverse direction y; and N grooves A arranged in an array along the transverse direction y of the alignment layer 010 are formed on the alignment layer 010. Each groove A is an elongated groove, and the lengthwise direction of each groove A is parallel to the lengthwise direction x of the alignment layer 010. N is a positive integer greater than or equal to 2. But the embodiments of the present disclosure are not limited thereto. For instance, the N value may be set according to actual conditions. A first longitudinal section of each groove A may be V-shaped, but the embodiments of the present disclosure are not limited thereto. The first longitudinal section of the groove A refers to a section which is perpendicular to the upper surface of the alignment layer 010 and parallel to the transverse direction y of the alignment layer 010. One end of each groove A is disposed on a corresponding area of each positive electrode 0141 as shown in FIG. 6-3 or 6-4 on the alignment layer 010, and another end is disposed on a corresponding area of each negative electrode 0142 as shown in FIG. 6-3 or 6-4 on the alignment layer 010. The N grooves A may be communicated with each other. FIG. 6-6 shows a situation of the N grooves A communicated with each other. As illustrated in FIG. 6-6, after the N grooves are communicated, each of the N grooves A includes two openings. FIG. 6-7 shows another situation of the N grooves A communicated with each other. As illustrated in FIG. 6-7, after the N grooves A are communicated, the N grooves A are communicated at one end of each of the N grooves A; and after the N grooves A are communicated, each groove A includes one opening.

Optionally, the alignment layer 010 may be made from PI materials or inorganic materials. For instance, in an instance that the alignment layer 010 is made from the PI materials, the forming process of the alignment layer 010 may include depositing a layer of PI materials with certain thickness on the substrate provided with the ITO electrode 014 by coating, magnetron sputtering, thermal evaporation or PECVD; obtaining the alignment layer 010 by curing the PI materials; aligning the alignment layer 010 by a rubbing process or a photo-alignment process; and forming a plurality of grooves A arranged in an array along the transverse direction y of the alignment layer 010 on the alignment layer 010. One end of each groove A is disposed on a corresponding area of each positive electrode 0141 of the ITO electrode 014 in FIG. 6-3 or 6-4 on the alignment layer 010, and another end is disposed on a corresponding area of each negative electrode 0142 of the ITO electrode 014 in FIG. 6-3 or 6-4 on the alignment layer 010. As the grooves formed by the photo-alignment process have high consistency, the photo-alignment process is selected to align the alignment layer 010 in the embodiment of the present disclosure.

In an instance that the alignment layer 010 is made from the inorganic materials, the forming process of the alignment layer 010 may include depositing a layer of inorganic materials with certain thickness on the substrate provided with the ITO electrode 014 by coating, magnetron sputtering, thermal evaporation or PECVD process; obtaining the alignment layer 010 by curing the inorganic materials; and aligning the alignment layer 010 by micromachining process, and forming a plurality of grooves A arranged in an array along the transverse direction y of the alignment layer 010 on the alignment layer 010. The micromachining process is, for instance, nanoimprint process or MEMS process.

It is noted that description is given in the embodiment of the present disclosure by taking the case that the alignment layer 010 is made from PI materials or inorganic materials as an example. For instance, the alignment layer 010 may also be made from other materials. The groove as shown in FIG. 6-5 is only illustrative, and the embodiments of the present disclosure are not limited thereto. For instance, the structure of the grooves may be a microstructure, and the order of magnitude of the width of the grooves may be in nanoscale.

In the embodiment of the present disclosure, in an instance that the alignment layer 010 is made from PI materials, a groove may be formed at the same end of two adjacent grooves A by a rubbing process or a photo-alignment process; in an instance that the groove A is not a groove which is the closest to a side parallel to the lengthwise direction of the alignment layer 010, both ends of the groove A are respectively communicated with adjacent grooves to form the grooves as shown in FIG. 6-6; or one groove is formed at the same end of N grooves A by a rubbing process or a photo-alignment process, so that the N grooves A are communicated to form the grooves as shown in FIG. 6-7. In an instance that the alignment layer 010 is made from inorganic materials, a groove may be formed at the same end of two adjacent grooves A by a micromachining process; in an instance that the groove A is not a groove which is the closest to a side parallel to the lengthwise direction of the alignment layer 010, both ends of the groove A are respectively communicated with adjacent grooves to form the grooves as shown in FIG. 6-6; or one groove is formed at the same end of N grooves A by a micromachining process, so that the N grooves A are communicated to form the grooves as shown in FIG. 6-7.

S603: forming a covering layer on a surface of the alignment layer provided with the grooves, so that channels provided with openings at both ends can be formed between the alignment layer and the covering layer.

Figures 6, 7, 8:
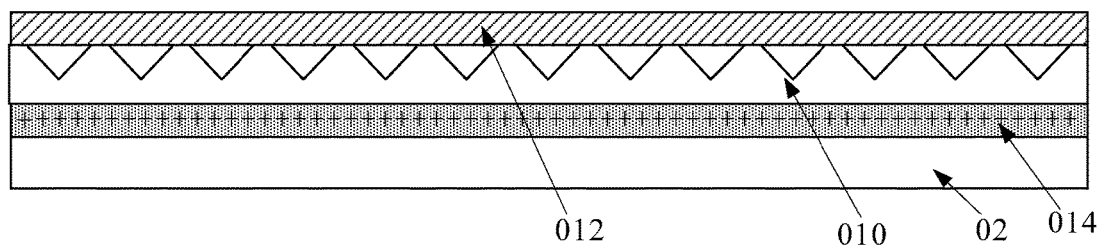

As illustrated in FIG. 6-8 which is a schematic structural view of a polarizer obtained after the step of forming a covering layer 012 on a surface of the alignment layer 010 provided with the grooves, the covering layer 012 may be a PET film; a lower surface of the PET film may be a rectangle which is same as the upper surface of the alignment layer 010. The covering layer 012 may be adhered to the surface of the alignment layer 010 provided with the grooves by bonding. Exemplarily, the forming process of the covering layer 012 may include coating a layer of optically clear adhesive (OCA) on the lower surface of the PET film; then, aligning one surface of the PET film coated with the OCA to the surface of the alignment layer 010 provided with the grooves, and applying a pressure with preset intensity to the PET film, so that the PET film can be adhered to the surface of the alignment layer 010 provided with the grooves; and then, roasting the PET film for predetermined time duration under a preset temperature, and curing the PET film, so that the PET film can be fixed on the surface of the alignment layer 010 provided with the grooves. The preset intensity, the preset temperature and the predetermined duration may all be set according to actual demands. Exemplarily, the preset intensity is about 5 Pa; the preset temperature is about 90□; and the predetermined duration is about 10 min. That is, for instance, after one surface of the PET film coated with the OCA is aligned to the surface of the alignment layer 010 provided with the grooves, the pressure of 5 Pa is applied to the PET film, so that the PET film can be adhered to the surface of the alignment layer 010 provided with the grooves; and subsequently, the PET film is roasted for 10 min at the temperature of 90□, and it is cured to allow it being fixed on the surface of the alignment layer 010 provided with the grooves. But the embodiments of the present disclosure are not limited thereto.

It is noted that, as illustrated in FIG. 6-8, after the covering layer 012 is formed on the surface of the alignment layer 010 provided with the grooves, as the covering layer 012 only makes contact with the surface of the alignment layer 010 provided with the grooves and does not contact surfaces of the grooves, channels provided with openings at both ends may be formed between the alignment layer 010 and the covering layer 012.

It is also noted that, in an instance that the N grooves are communicated with each other, as shown in FIG. 6-6, the channels formed between the alignment layer 010 and the covering layer 012 may include two openings, and the two openings are respectively disposed on two channels, which are the closest to a side parallel to the lengthwise direction x of the alignment layer 010, on the alignment layer 010 and among the N channels; and in an instance that the N grooves are communicated with each other as shown in FIG. 6-7, the channels formed between the alignment layer 010 and the covering layer 012 may include N openings, and each channel includes one opening which is arranged close to the same side of the alignment layer 010.

It is also noted that description is given in the embodiment of the present disclosure by taking the case that the covering layer 012 is a PET film as an example. But the embodiments of the present disclosure are not limited thereto. For instance, the covering layer 012 may also be made from other materials.

S604: filling liquid metal into the channels. The liquid metal includes a plurality of liquid metal structures.

FIG. 6-9 is a schematic structural view of a polarizer obtained after the step of filling liquid metal 011 into the channels. As illustrated in FIG. 6-9, the liquid metal 011 is filled into each channel. The liquid metal 011 may include a plurality of liquid metal structures and may be an alloy formed by at least two of cesium, gallium, rubidium, potassium, sodium, indium, lithium, tin, bismuth, zinc, antimony, magnesium and aluminum, But the embodiments of the present disclosure are not limited thereto, and no further details are provided for the preparation processes of the liquid metal 011 herein.

In embodiments of the present disclosure, the step of filling the liquid metal into the channels may include the following four ways:

First Way: FIG. 6-10 is a flowchart of a process for filling the liquid metal into the channels, provided by the embodiment as shown in FIG. 6-1. As illustrated in FIG. 6-10, the process may include the following steps.

S6041a: evacuating the channels.

Exemplarily, a vacuum pump may be adopted to evacuate the channels on the opening at one end of the channels, and air in the channels is discharged, so that vacuum can be formed in the channels. The evacuating process may adopt a routine process. No further description will be given here in the embodiments of the present disclosure. But it is noted that in the embodiments of the present disclosure, the channels may be evacuated under vacuum condition.

It is also noted that, in the embodiments of the present disclosure, as the number of the channels is N, each channel may be respectively evacuated, so that vacuum can be formed in each channel. In an instance that each channel is a channel provided with openings at both ends, the channel may be evacuated at both ends of each channel respectively. But the embodiments of the present disclosure are not limited thereto.

S6042a: placing the evacuated substrate provided with the alignment layer and the covering layer in a liquid metal tank containing the liquid metal, and filling the liquid metal in the liquid metal tank into the channels.

As the pressure in the channels is less than the ambient pressure after the channels are evacuated, after the evacuated substrate provided with the alignment layer and the covering layer is placed into the liquid metal tank containing the liquid metal, the liquid metal in the liquid metal tank may enter the channels from the openings of the channels under the action of the ambient pressure.

It is noted that, in an instance that the liquid metal tank is under a non-vacuum environment, before the evacuated substrate provided with the alignment layer and the covering layer is placed into the liquid metal tank containing the liquid metal, the openings of the channels may be sealed at first, and subsequently, after the evacuated substrate provided with the alignment layer and the covering layer is placed into the liquid metal tank containing the liquid metal, the openings of the channels are opened, so that the liquid metal in the liquid metal tank can enter the channels from the openings of the channels under the action of the ambient pressure; and in an instance that the liquid metal tank is under a vacuum environment, after the evacuated substrate provided with the alignment layer and the covering layer is placed into the liquid metal tank containing the liquid metal, a pressure may be applied to the liquid metal on a surface of the liquid metal in the liquid metal tank, so that the liquid metal in the liquid metal tank can enter the channels from the openings of the channels.

It is also noted that, in the embodiments of the present disclosure, the process of placing the evacuated substrate provided with the alignment layer and the covering layer into the liquid metal tank containing the liquid metal refers to that the whole evacuated substrate provided with the alignment layer and the covering layer being immersed into the liquid metal tank.

It is also noted that, for instance, the steps S6041a and S6042a may be executed simultaneously, namely, after the substrate provided with the alignment layer and the covering layer is placed into the liquid metal tank containing the liquid tank, the channels are evacuated on the opening at one end of the channels; and in the evacuating process, the liquid metal in the liquid metal tank may enter the channels from the opening at the other end of the channels under the action of the ambient pressure.

Second Way: FIG. 6-11 is a flowchart of another process for filling the liquid metal into the channels, provided by the embodiment as shown in FIG. 6-1. As illustrated in FIG. 6-11, the process may include the following steps.

S6041b: sealing the opening at one end of the channels.

Exemplarily, a PET film may be adopted to seal the opening at one end of the channels. The process of sealing the opening at one end of the channels is the same as or similar to the process of forming the covering layer on the surface of the alignment layer provided with the grooves in the step S603. The sealing process may refer to the step S603. No further description will be given here in the embodiment.

S6042b: evacuating the channel.

Exemplarily, a vacuum pump may be adopted to evacuate the channel on the opening at the unsealed end of the channels, and air in the channels is discharged, so that vacuum can be formed in the channels. It is noted that in the embodiment of the present disclosure, the channels may be evacuated under vacuum condition.

It is also noted that description is given in the embodiment of the present disclosure by taking the case that the channels are evacuated on the opening at the unsealed end of the channels as an example. For instance, the channels may also be evacuated at the sealed end. But the embodiments of the present disclosure are not limited thereto.

S6043b: filling the liquid metal into the channel from the opening at the other end of the channels by an ODF process.

For instance, the liquid metal is filled into the channels from the opening at the unsealed end of the channels by an ODF process. In order to allow the liquid metal being uniformly filled into the channels, the filled liquid metal may be inspected through a charge coupled cell (CCD) at the same time when the liquid metal is filled, so that the uniformity of the filled liquid metal can be achieved. The CCD inspection process may refer to a routine process. No further description will be given here in the embodiment of the present disclosure.

It is also noted that, for instance, the steps S6042b and S6043b may be executed simultaneously, namely the channels are evacuated at the sealed end of the channels, and in the vacuuming process, the liquid metal is filled into the channels from the opening at the unsealed end of the channels by ODF. But the embodiments of the present disclosure are not limited thereto.

In the above two ways, the liquid metal may be filled into each channel in an instance that the N channels are not communicated with each other. In embodiments of the present disclosure, when the N channels are communicated with each other, the following third way and fourth way may also be adopted to fill the liquid metal into the channels. In an instance that the N channels are communicated with each other, the grooves forming the N channels may be communicated with each other by any way in FIG. 6-6 or 6-7.

Third Way: FIG. 6-12 is a flowchart of still another process for filling the liquid metal into the channels, provided by the embodiment as shown in FIG. 6-1. As illustrated in FIG. 6-12, the process may include the following steps.

S6041c: sealing the openings of the N channels except the first opening which may be any opening among the openings of the N channels.

In the embodiment of the present disclosure, as the N channels may be communicated with each other, the openings of the N channels except the first opening may be sealed. The first opening may be any opening among the openings of the N channels. The process of sealing the openings of the channels is the same as or similar to the process of forming the covering layer on the surface of the alignment layer provided with the grooves in the step S603. The sealing process may refer to the step S603. No further description will be given here in the embodiment.

It is noted that, in an instance that the N channels are communicated with each other, the grooves provided with the N channels may be communicated with each other by any way as shown in FIG. 6-6 or 6-7. In an instance that the grooves provided with the N channels are communicated with each other by the way as shown in FIG. 6-6, either opening of the two openings of the communicated N channels may be sealed. In an instance that the grooves provided with the N channels are communicated with each other by the way as shown in FIG. 6-7, any N−1 openings in the N openings of the communicated N channels may be sealed. But the embodiments of the present disclosure are not limited thereto.

S6042c: evacuating the N channels.

Exemplarily, the N channels may be evacuated on the first opening of the N channels, or the N channels may also be evacuated on any of the openings of the N channels except the first opening, but the embodiments of the present disclosure are not limited thereto. Air in the N channels can be discharged by vacuum-pumping, so that vacuum can be formed in the N channels.

S6043c: filling the liquid metal into the channels from the first opening by an ODF process.

After the N channels are evacuated, the liquid metal may be filled into the channels from the first opening by ODF. When the liquid metal is filled, the filled liquid metal may be inspected by a CCD so as to allow the uniformity of the filled liquid metal.

It is noted that description is given in the embodiment of the present disclosure by taking the case that the steps S6042c and S6043c are executed in sequence as an example. For instance, the steps S6042c and S6043c may also be executed simultaneously, namely the channels may be evacuated on one side and the liquid metal may be filled into the channels from the first opening on the other side, but the embodiments of the present disclosure are not limited thereto.

Fourth Way: FIG. 6-13 is a flowchart of still another process of filling the liquid metal into the channels, provided by the embodiment as shown in FIG. 6-1. As illustrated in FIG. 6-13, the process may include the following steps.

S6041d: sealing the openings of the N channels except the first opening which may be any opening among the openings of the N channels.

In the embodiment of the present disclosure, as the N channels may be communicated with each other, the openings of the N channels except the first opening may be sealed. The first opening may be any opening among the openings of the N channels. The process of sealing the openings of the channels is the same as or similar to the process of forming the covering layer on the surface of the alignment layer provided with the grooves in the step S603. The sealing process may refer to the step S603. No further description will be given here in the embodiment.

It is noted that, in an instance that the N channels are communicated with each other, the grooves provided with the N channels may be communicated with each other by any way as shown in FIG. 6-6 or 6-7; in an instance that the grooves provided with the N channels are communicated with each other by the way as shown in FIG. 6-6, either opening of the two openings of the communicated N channels may be sealed; and in an instance that the grooves provided with the N channels are communicated with each other by the way as shown in FIG. 6-7, any N−1 openings in the N openings of the communicated N channels may be sealed, but the embodiments of the present disclosure are not limited thereto.

S6042d: evacuating the N channels.

Exemplarily, the N channels may be evacuated on the first opening of the N channels, or the N channels may also be evacuated on any of the openings of the N channels except the first opening. The embodiments of the present disclosure are not limited thereto. Air in the N channels may be discharged by vacuum-pumping, so that vacuum can be formed in the N channels.

S6043d: placing the evacuated substrate provided with the alignment layer and the covering layer into a liquid metal tank containing the liquid metal, so that the liquid metal in the liquid metal tank can enter the channels from the first opening and be filled into the channels.

As the pressure in the channels is less than the ambient pressure after the channels are evacuated, after the evacuated substrate provided with the alignment layer and the covering layer is placed in the liquid metal tank containing the liquid metal, the liquid metal in the liquid metal tank may enter the channels from the first opening of the channels and be filled into the channels, under the action of the ambient pressure.

It is noted that, when the liquid metal tank is under a non-vacuum environment, before the evacuated substrate provided with the alignment layer and the covering layer is placed into the liquid metal tank containing the liquid metal, the first opening of the channels may be sealed at first, and subsequently, after the evacuated substrate provided with the alignment layer and the covering layer is placed into the liquid metal tank containing the liquid metal, the first opening of the channels is opened, so that the liquid metal in the liquid metal tank can enter the channels from the first opening of the channels and be filled into the channels under the action of the ambient pressure. When the liquid metal tank is under a vacuum environment, after the evacuated substrate provided with the alignment layer and the covering layer is placed into the liquid metal tank containing the liquid metal, pressure may be applied to the liquid metal on a surface of the liquid metal in the liquid metal tank, so that the liquid metal in the liquid metal tank can enter the channels from the first opening of the channels and be filled into the channels.

It is also noted that, in the embodiment of the present disclosure, the process of placing the evacuated substrate provided with the alignment layer and the covering layer into the liquid metal tank containing the liquid metal refers to that the evacuated substrate provided with the alignment layer and the covering layer is entirely immersed into the liquid metal tank.

It is also noted that, for instance, the steps S6042d and S6043d may be executed simultaneously, namely after the substrate provided with the alignment layer and the covering layer is placed into the liquid metal tank containing the liquid tank, the N channels are evacuated, and in the evacuating process, the liquid metal in the liquid metal tank may enter the channels from the first opening of the channels under the action of the ambient pressure.

S605: applying an electric field parallel to the lengthwise direction of the grooves to the liquid metal, so that each liquid metal structure can be stretched along the lengthwise direction of the grooves to form a rod-like structure and the major-axis direction of each liquid metal structure is parallel to the lengthwise direction of the groove.

As one end of the grooves is disposed on a corresponding area of a positive electrode of an ITO electrode and another end is disposed on a corresponding area of a negative electrode of the ITO electrode, in an instance that a positive voltage is applied to the positive electrode of the ITO electrode and a negative voltage is applied to the negative electrode of the ITO electrode, as the ITO electrode has resistance, there is a voltage difference between the positive electrode and the negative electrode of the ITO electrode, so that an electric field can be formed between the positive electrode and the negative electrode of the ITO electrode, and the direction of the electric field is parallel to the lengthwise direction of the grooves.

The liquid metal has high liquidity and can be in different forms under the action of different electric fields or magnetic fields. In the embodiments of the present disclosure, a voltage with preset value may be applied to the ITO electrode for a predetermined duration, so that each liquid metal structure can be stretched along the lengthwise direction of the groove provided with the liquid metal structures to form a rod-like structure under the action of the electric field formed by the ITO electrode, and finally the major-axis direction of each liquid metal structure having the rod-like structure can be parallel to the lengthwise direction of the grooves. Both the preset value and the predetermined duration may be set according to actual demands, but the embodiments of the present disclosure are not limited thereto. Exemplarily, the positive electrode of the ITO electrode may be connected with a positive electrode of the power supply and the negative electrode of the ITO electrode may be connected with a negative electrode of the power supply. The voltage of the power supply is adjusted to be 2-10V, so that a voltage of 2-10V can be applied to the ITO electrode by the power supply. As the ITO electrode has resistance, there is a voltage difference between the positive electrode and the negative electrode of the ITO electrode, so that an electric field can be formed between the positive electrode and the negative electrode of the ITO electrode, and the direction of the electric field is parallel to the lengthwise direction of the grooves. The voltage is applied to the ITO electrode for 10-30 s, so that the electric field with preset value can be applied to the liquid metal through the ITO electrode for 10-30 s. Thus, each liquid metal structure can be stretched along the lengthwise direction of the groove, where they are, to form a rod-like structure under the action of the electric field formed by the ITO electrode, and finally the major-axis direction of each liquid metal structure having the rod-like structure can be parallel to the lengthwise direction of the groove.

Exemplarily, as illustrated in FIG. 3, liquid metal 011 is formed in a groove A and includes a plurality of liquid metal structures 0111. Each liquid metal structure 0111 is a rod-like structure. The major-axis direction of each liquid metal structure 0111 is parallel to the lengthwise direction x2 of the groove A. The liquid metal structure 0111 having the rod-like structure is a 3D structure having a major axis and a minor axis. In an instance that the major axis of the liquid metal structure 0111 having the rod-like structure is parallel to the lengthwise direction of the groove A, the minor axis of the liquid metal structure 0111 is perpendicular to the lengthwise direction of the groove A. In the embodiment of the present disclosure, the minor-axis direction of the liquid metal 0111 is the polarization direction of the polarizer, and the major-axis direction of the liquid metal 0111 is perpendicular to the polarization direction of the polarizer. It is noted that in the embodiment of the present disclosure, each liquid metal structure 0111 may be formed by a plurality of liquid metal molecules. But the embodiments of the present disclosure are not limited thereto.

S606: curing the liquid metal.

When each liquid metal structure is stretched along the lengthwise direction of the grooves to form a rod-like structure and the major-axis direction of each liquid metal structure is parallel to the lengthwise direction of the groove, the liquid metal may be cured, so that each liquid metal structure can still be a rod-like structure after the electric field is removed, and the major-axis direction of each liquid metal structure is parallel to the lengthwise direction of the groove to form a stable polarization direction of the polarizer.

The liquid metal at room temperature may be in solid state under a preset temperature lower than the room temperature. Thus, in the embodiment of the present disclosure, the liquid metal may be cured by reducing the temperature.

S607: obtaining the polarizer by forming a protective layer on the covering layer.

As illustrated in FIG. 6-14 which is a schematic structural view of a polarizer obtained after the step of forming a protective layer 013 on the covering layer 012, silicide with certain thickness may be deposited on the covering layer 012 by coating, magnetron sputtering, thermal evaporation or PECVD process and can be as the protective layer 013. The protective layer 013 may be formed by oxide, nitride or oxynitride, and the corresponding reaction gas may be a mixed gas of $SiH_4$, $NH_3$ and $N_2$ or a mixed gas of $SiH_2Cl_2$, $NH_3$ and $N_2$. After the protective layer 013 is formed on the covering layer 012, the polarizer can be obtained.

It is noted that description is given in the embodiment of the present disclosure by taking the case that the protective layer 013 is made from silicide as an example. But the embodiments of the present disclosure are not limited thereto. For instance, the protective layer 013 may also be made from other materials.

S608: stripping off the polarizer from the carrier substrate.

As illustrated in FIG. 6-15 which is a schematic structural view of a polarizer obtained after the carrier substrate is stripped off, in the embodiments of the present disclosure, as the stable polarization direction has been formed in the step S606, the ITO electrode may also be stripped off from the polarizer when the carrier substrate is stripped off. In the embodiments of the present disclosure, the carrier substrate and the ITO electrode may be stripped off by laser lift-off (LLO).

It is noted that description is given in the embodiment of the present disclosure by taking the case that the ITO electrode is stripped off as an example. For instance, in order to reduce the manufacturing process, the ITO electrode may not be stripped off, but the embodiments of the present disclosure are not limited thereto.

S609: forming a protective layer on a surface of the alignment layer not provided with the grooves.

As shown in FIG. 6-16 which is a schematic structural view of a polarizer obtained after the step of forming a protective layer 013 on a surface of the alignment layer 010 not provided with the grooves. The process of forming the protective layer 013 on the surface of the alignment layer 010 not provided with the grooves may refer to the process of forming the protective layer on the covering layer in the step S607. No further description will be given here.

It is noted that in an instance that the ITO electrode is not stripped off in the step S608, the protective layer 013 is formed on one surface of the ITO electrode not contacting the alignment layer. But the embodiments of the present disclosure are not limited thereto.

It is also noted that, in an embodiment of the present disclosure, an antireflection film or the like may also be formed on the protective layer, so that the polarizer can have the functions of antireflection, scratch resistance, high brightness, and the like.

It is also noted that description is given in the embodiments of the present disclosure by taking the case that the ITO electrode is formed on the carrier substrate as an example. But the embodiments of the present disclosure are not limited thereto. For instance, the ITO electrode may not be formed on the carrier substrate but formed on the surface of the alignment layer provided with the grooves, or the ITO electrode may be formed on both the carrier substrate and the surface of the alignment layer provided with the grooves, or the ITO electrode may also be formed in other region. The ITO electrode in the embodiments of the present disclosure is mainly used for applying a voltage to the liquid metal, so that the liquid metal structure can be stretched along the lengthwise direction of the grooves to form a rod-like structure and the major-axis direction of each liquid metal structure is parallel to the lengthwise direction of the grooves. But the embodiments of the present disclosure are not limited thereto.

It is also noted that, in an instance that the N channels are communicated with each other and the liquid metal is formed in the channels, the liquid metal will also be formed in the communicating regions of the channels, which may affect the polarization direction of the polarizer. For instance, the polarizer may be cut as required to remove the communicating regions of the N channels. But the embodiments of the present disclosure are not limited thereto.

It is also noted that the sequence of the steps of the method of manufacturing the polarizer, provided by the embodiments, may be properly adjusted and a step may also be correspondingly added or reduced. Any variable method which may be readily contemplated by one of ordinary skill in the art within the disclosed technical scope of the present disclosure shall fall within the scope of the present disclosure. Thus, no further description will be given here. Exemplarily, in the embodiments of the present disclosure, the step S601 may be deleted, namely the ITO electrode may not be formed; and the alignment layer may be directly formed and the liquid metal is formed in the grooves on the alignment layer and cured in the subsequent step, so that the polarization direction of the polarizer can also be formed. The polarization direction of the polarizer is perpendicular to the lengthwise direction of the grooves on the alignment layer.

In the embodiments of the present disclosure, if the polarization direction of incident light is parallel to the lengthwise direction of the grooves, free electrons in the liquid metal disposed in the grooves are subjected to directional movement along the lengthwise direction of the grooves under the action of an external electric field. As the length of the grooves is much longer than the wavelength of the incident light, it is equivalent that the polarized light of the incident light applied to a surface of a metal film and along the lengthwise direction of the grooves is reflected. To the contrary, in an instance that the polarization direction of the incident light is perpendicular to the lengthwise direction of the groove, as the width of the groove is only about one-third to about one-quarter of the wavelength of the incident light, the motion of the free electrons is severely restricted and the free electrons cannot have useful effect with the incident light, so the incident light is not reflected and refracted but transmitted.

In the method of manufacturing the polarizer, provided by the embodiments of the present disclosure, the alignment layer is formed on the carrier substrate and the grooves are formed on the alignment layer; the liquid metal is formed in the grooves; the electric field parallel to the lengthwise direction of the grooves is applied to the liquid metal, so that the liquid metal structure can be stretched along the lengthwise direction of the grooves to form a rod-like structure and the major-axis direction of the liquid metal structure is parallel to the lengthwise direction of the grooves; subsequently, the liquid metal is cured to obtain the polarizer; and the polarizer is stripped off from the carrier substrate. The major-axis direction of the liquid metal structure is parallel to the lengthwise direction of the grooves, and the minor-axis direction of the liquid metal structure is the polarization direction of the polarizer. In the embodiments of the present disclosure, the liquid metal is adopted to achieve the polarization direction of the polarizer, so that the polarization direction of the polarizer can be readily controlled and the yield of the polarizer can be higher.

The polarizer provided by the embodiments of the present disclosure adopts the liquid metal to achieve the polarization direction of the polarizer. As the cost of the liquid metal is not expensive, the cost of the polarizer provided by the embodiments of the present disclosure is not expensive.

FIG. 7 is a flowchart of still another method of manufacturing a polarizer, provided by an embodiment of the present disclosure. The method of manufacturing the polarizer may be used for manufacturing the polarizer 01 as shown in FIG. 1 or FIG. 4. As illustrated in FIG. 7, the method of manufacturing the polarizer may include the following steps.

S701: forming an alignment layer on a carrier substrate and forming grooves on the alignment layer.

The carrier substrate may be a transparent substrate, for instance, it may be a substrate which is made from light guide nonmetallic materials with certain firmness, such as glass, quartz and transparent resin. An upper surface of the carrier substrate may be in a shape of a rectangle.

FIG. 7-2 is a schematic structural view of a polarizer obtained after the step of forming an alignment layer 010 on a carrier substrate 02. Description is given in the embodiment of the present disclosure by taking the case that the upper surface of the carrier substrate 02 is a rectangle as an example. An upper surface of the alignment layer 010 may be a rectangle which is the same as the upper surface of the carrier substrate 02; the transverse direction of the alignment layer 010 may be y; and the transverse direction y of the alignment layer 010 is parallel to the transverse direction of the carrier substrate 02. The upper surface of the alignment layer 010 is the same as the upper surface of the carrier substrate 02 refers to that the shape of the upper surface of the alignment layer 010 is the same as the shape of the upper surface of the carrier substrate 02 and the area of the upper surface of the alignment layer 010 is the same as the area of the upper surface of the carrier substrate 02.

As illustrated in FIG. 7-2, N grooves A arranged in an array along the transverse direction y of the alignment layer 010 are formed on the alignment layer 010; each groove A is an elongated groove; and the lengthwise direction of each groove A is perpendicular to the transverse direction y of the alignment layer 010. N is a positive integer greater than or equal to 2. But the embodiments of the present disclosure are not limited thereto, and N may be other values. A first longitudinal section of each groove A may be V-shaped, but the embodiments of the present disclosure are not limited thereto. The first longitudinal section of the groove A refers to a section which is perpendicular to the upper surface of the alignment layer 010 and parallel to the transverse direction y of the alignment layer 010.

Optionally, the alignment layer 010 may be made from PI materials or inorganic materials. In an instance that the alignment layer 010 is made from the PI materials, the forming process of the alignment layer 010 may include depositing a layer of PI materials with certain thickness on the carrier substrate 02 by coating, magnetron sputtering, thermal evaporation or PECVD process; obtaining the alignment layer 010 by curing the PI materials; and aligning the alignment layer 010 by a rubbing process or a photo-alignment process, and forming a plurality of grooves A arranged in an array along the transverse direction y of the alignment layer 010 on the alignment layer 010. It is noted that as the grooves formed by the photo-alignment process have high consistency, the photo-alignment process is selected to align the alignment layer 010 in the embodiment of the present disclosure.

In an instance that the alignment layer 010 is made from inorganic materials, the forming process of the alignment layer 010 may include depositing a layer of inorganic materials with certain thickness on the carrier substrate 02 by coating, magnetron sputtering, thermal evaporation or PECVD process; obtaining the alignment layer 010 by curing the inorganic materials; and aligning the alignment layer 010 by a micromachining process, and forming a plurality of grooves A arranged in an array along the transverse direction y of the alignment layer 010 on the alignment layer 010. The micromachining process may be a nanoimprint process, a MEMS process, or the like.

It is noted that description is given in the embodiments of the present disclosure by taking the case that the alignment layer 010 is made from PI materials or inorganic materials as an example. But the embodiments of the present disclosure are not limited thereto. For instance, the alignment layer 010 may also be made from other materials. The groove as shown in FIG. 7-2 is only illustrative, and the embodiments of the present disclosure are not limited thereto. For instance, the structure of the grooves may be a microstructure, and the width of the groove may be in nanoscale.

S702: transferring the liquid metal into the grooves of the alignment layer by a transfer stencil adsorbed with the liquid metal.

FIG. 7-3 is a schematic structural view of a polarizer obtained after the step of transferring the liquid metal 011 into the grooves of the alignment layer 010. As illustrated in FIG. 7-3, the liquid metal 011 is formed in each groove and may include a plurality of liquid metal structures. The liquid metal 011 may be an alloy formed by at least two of cesium, gallium, rubidium, potassium, sodium, indium, lithium, tin, bismuth, zinc, antimony, magnesium and aluminum, but the embodiments of the present disclosure are not limited thereto, and no further details are provided for the preparation processes of the liquid metal 011 herein. It is noted that in the embodiments of the present disclosure, each liquid metal structure 0111 may be formed by a plurality of liquid metal molecules, but the embodiments of the present disclosure are not limited thereto.

In the embodiments of the present disclosure, the liquid metal 011 may be transferred into the grooves of the alignment layer 010 by a roll-to-roll process. A plurality of strip patterns are formed on the transfer stencil adopted in the roll-to-roll process, and the distance between any two adjacent strip patterns may be equal to the distance between any two adjacent grooves. The liquid metal may be adsorbed on the strip patterns, subsequently, the transfer stencil is wrapped on rollers. The rollers are adopted to roll on the surface of the alignment layer 010 provided with the grooves. In the process of rolling the rollers, the strip patterns on the transfer stencil are aligned to the grooves, and hence the liquid metal on the strip patterns may be transferred into the grooves.

S703: forming an ITO electrode on a surface of the alignment layer provided with the grooves, and the liquid metal is formed in the grooves. The ITO electrode includes a positive electrode and a negative electrode. The positive electrode corresponds to one end of the grooves; and the negative electrode corresponds to another end of the grooves.

FIG. 7-4 is a schematic structural view of a polarizer obtained after the step of forming an ITO electrode 014 on the surface of the alignment layer 010 provided with the grooves. Description is given in the embodiments of the present disclosure by taking the case that the upper surface of the alignment layer 010 is a rectangle as an example. As illustrated in FIG. 7-4, optionally, the ITO electrode 014 may be formed on the entire upper surface of the alignment layer 010, or N strip ITO electrodes 014 arranged in an array may be formed on the upper surface of the alignment layer 010 along the transverse direction y of the alignment layer 010, so that the lengthwise direction of each strip ITO electrode 014 can be parallel to the lengthwise direction of the alignment layer 010. N is a positive integer greater than or equal to 2. But the embodiments of the present disclosure are not limited thereto. N may also be other values. Description is given in the embodiment of the present disclosure by taking the case that the ITO electrode 014 is formed on the entire surface of the alignment layer 010 provided with the grooves as an example. The ITO electrode may include a positive electrode and a negative electrode (not shown in FIG. 7-4). The positive electrode corresponds to one end of the grooves; and the negative electrode corresponds to another end of the grooves. The forming process of the ITO electrode 014 and the top view of the ITO electrode 014 may refer to the step S601 in the embodiment as shown in FIG. 6-1 and FIGS. 6-3 and 6-4. No further description will be given herein.

S704: applying an electric field parallel to the lengthwise direction of the grooves to the liquid metal, so that each liquid metal structure can be stretched along the lengthwise direction of the grooves to form a rod-like structure and the major-axis direction of each liquid metal structure is parallel to the lengthwise direction of the grooves.

S705: curing the liquid metal.

The steps S704 and S705 are the same as or similar to the steps S605 and S606 in the embodiment as shown in FIG. 6-1, and the implementation processes thereof may refer to the steps S605 and S606 in the embodiment as shown in FIG. 6-1. No further description will be given herein.

S706: stripping off the ITO electrode.

The schematic structural view of the polarizer obtained after the ITO electrode is stripped off is the same as or similar to FIG. 7-3. No further description will be given herein. In the embodiment of the present disclosure, as the stable polarization direction has been formed in the step S705, in order to reduce the light absorptivity of the polarizer and improve the light transmittance, the ITO electrode may be stripped off from the surface of the alignment layer 010 provided with the grooves. In the embodiment of the present disclosure, the ITO electrode may be stripped off by LLO.

It is noted that description is given in the embodiment of the present disclosure by taking the case that the ITO electrode is stripped off as an example. For instance, in order to reduce the manufacturing process, the ITO electrode may not be stripped off. The embodiments of the present disclosure are not limited thereto.

S707: forming a covering layer on the surface of the alignment layer formed with the grooves.

FIG. 7-5 is a schematic structural view of a polarizer obtained after the step of forming a covering layer 012 on the surface of the alignment layer 010 provided with the grooves. The forming process of the covering layer 012 is the same as or similar to the step S603 in the embodiment as shown in FIG. 6-1. No further description will be given herein. But it is noted that as the liquid metal 011 is formed in the grooves in the step S706, in the embodiment, after the covering layer 012 is formed on the surface of the alignment layer 010 provided with the grooves, the liquid metal 011 has been filled into the channels between the alignment layer 010 and the covering layer 012.

S708: obtaining the polarizer by forming a protective layer on the covering layer.

S709: stripping off the polarizer from the carrier substrate.

S710: forming a protective layer on a surface of the alignment layer not formed with the grooves.

The steps S708 to S710 are the same as or similar to the steps S607 to S609 in the embodiment as shown in FIG. 6-1, and the implementation processes thereof may refer to the steps S607 to S609 in the embodiment as shown in FIG. 6-1. No further description will be given herein.

It is noted that description is given in the embodiment by taking the case that the ITO electrode is formed on the surface of the alignment layer provided with the grooves as an example. But the embodiments of the present disclosure are not limited thereto. For instance, the ITO electrode may not be formed on the surface of the alignment layer provided with the grooves, instead, it is formed on the carrier substrate, or the ITO electrode may be formed on both the carrier substrate and the surface of the alignment layer provided with the grooves, or the ITO electrode may be formed at another position. The ITO electrode in the embodiment of the present disclosure is mainly used for applying a voltage to the liquid metal, so that the liquid metal structure can be stretched along the lengthwise direction of the grooves to form a rod-like structure and the major-axis direction of each liquid metal structure is parallel to the lengthwise direction of the grooves. No further details are provided for the forming position of the ITO electrode herein.

It is also noted that, in an instance that the N channels are communicated with each other and the liquid metal is formed in the channels, the liquid metal will also be formed at communicating regions of the channels, and hence the polarization direction of the polarizer may be affected. For instance, the polarizer may be cut as required to remove the communicating regions of the N channels. No further details are provided for this herein.

It is also noted that the sequence of the steps of the method of manufacturing the polarizer, provided by the embodiment, may be properly adjusted, and a step may be correspondingly added or reduced. Any variable method which may be readily contemplated by an ordinary skill in the art within the disclosed technical scope of the present disclosure shall fall within the scope of the present disclosure. Thus, no further description will be given herein. Exemplarily, in the embodiment of the present disclosure, the step S703 may be deleted, namely the ITO electrode may not be formed; and the alignment layer is directly formed and the liquid metal is formed in the grooves on the alignment layer and cured in the subsequent step, so that the polarization direction of the polarizer can also be formed. The polarization direction of the polarizer is perpendicular to the lengthwise direction of the grooves on the alignment layer.

In the embodiment of the present disclosure, in an instance that the polarization direction of incident light is parallel to the lengthwise direction of the grooves, free electrons in the liquid metal disposed in the grooves are subjected to directional movement along the lengthwise direction of the grooves under an action of an external electric field. As the length of the grooves is much longer than the wavelength of the incident light, it is equivalent that polarized light of the incident light applied to a surface of a metal film and along the lengthwise direction of the groove is reflected. To the contrary, in an instance that the polarization direction of the incident light is perpendicular to the lengthwise direction of the grooves, as the width of the grooves is only about one-third to about one-quarter of the wavelength of the incident light, the motion of the free electrons is severely restricted and the free electrons cannot have useful effect with the incident light, so the incident light is not reflected and refracted but transmitted.

As stated above, in the method of manufacturing the polarizer, provided by the embodiment of the present disclosure, the alignment layer is formed on the carrier substrate and the grooves are formed on the alignment layer; the liquid metal is formed in the grooves; the electric field parallel to the lengthwise direction of the grooves is applied to the liquid metal, so that the liquid metal structure can be stretched along the lengthwise direction of the grooves to form a rod-like structure and the major-axis direction of the liquid metal structure is parallel to the lengthwise direction of the groove; subsequently, the liquid metal is cured to obtain the polarizer; and the polarizer is stripped off from the carrier substrate. The major-axis direction of the liquid metal structure is parallel to the lengthwise direction of the grooves, and the minor-axis direction of the liquid metal structure is the polarization direction of the polarizer. In the embodiment of the present disclosure, the liquid metal is adopted to achieve the polarization direction of the polarizer, so that the polarization direction of the polarizer can be readily controlled and the yield of the polarizer can be higher.

The polarizer provided by the embodiment of the present disclosure adopts the liquid metal to achieve the polarization direction of the polarizer. As the cost of the liquid metal is low, the cost of the polarizer provided by the embodiments of the present disclosure is low.

FIG. 8 is a schematic structural view of a display device 03 provided by an embodiment of the present disclosure. As illustrated in FIG. 8, the display device 03 includes an array substrate 031 and a color filter (CF) substrate 032 assembled together, and a liquid crystal layer 033 filled between the array substrate 031 and the CF substrate 032.

As illustrated in FIG. 8, the liquid crystal layer 033 includes a plurality of liquid crystal molecules 0331 and spacers 0332. The spacers 0332 contact the array substrate 031 and the CF substrate 032 respectively, and are configured to support the array substrate 031 and the CF substrate 032, so that a space can be formed between the array substrate 031 and the CF substrate 032, and the liquid crystal molecules 0331 are disposed in the space. The liquid crystal molecules 0331 may be positive liquid crystal molecules or negative liquid crystal molecules. An ITO electrode (not shown in FIG. 8) is disposed on the array substrate 031. When a voltage is applied to the ITO electrode, under the action of the electric field, major axes or minor axes of the liquid crystal molecules 0331 are regularly arranged along the direction of the electric field, so that the anisotropy can be displayed, and the polarization direction of incident light can be affected.

An upper polarizer 034 is disposed on a backlight side of the array substrate 032; a lower polarizer 035 is disposed on a side of the CF substrate 032 away from the array substrate 031; and the upper polarizer 034 and/or the lower polarizer 035 is any polarizer as shown in FIG. 1 or FIG. 4.

Figures 6, 7, 8, 9:
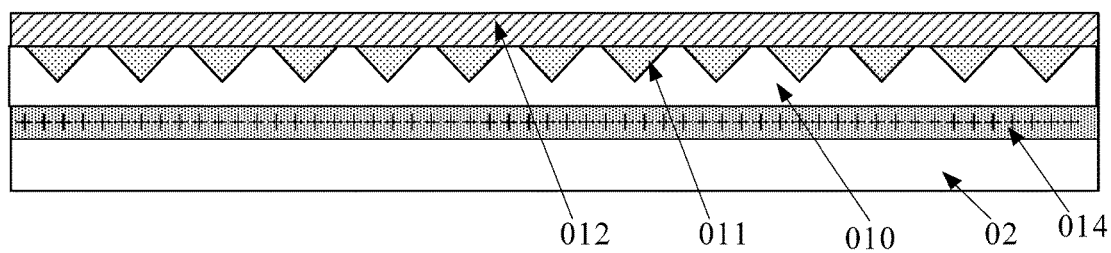
Figures 6, 7, 8, 9, 10:
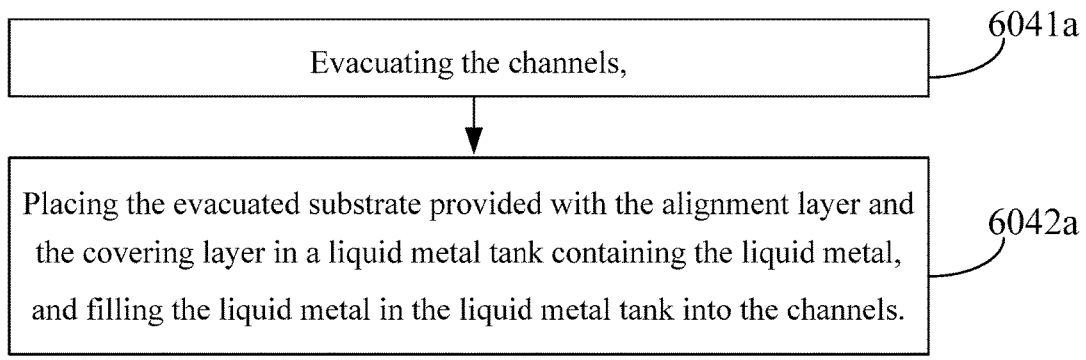
Figures 6, 7, 8, 9, 10, 11:
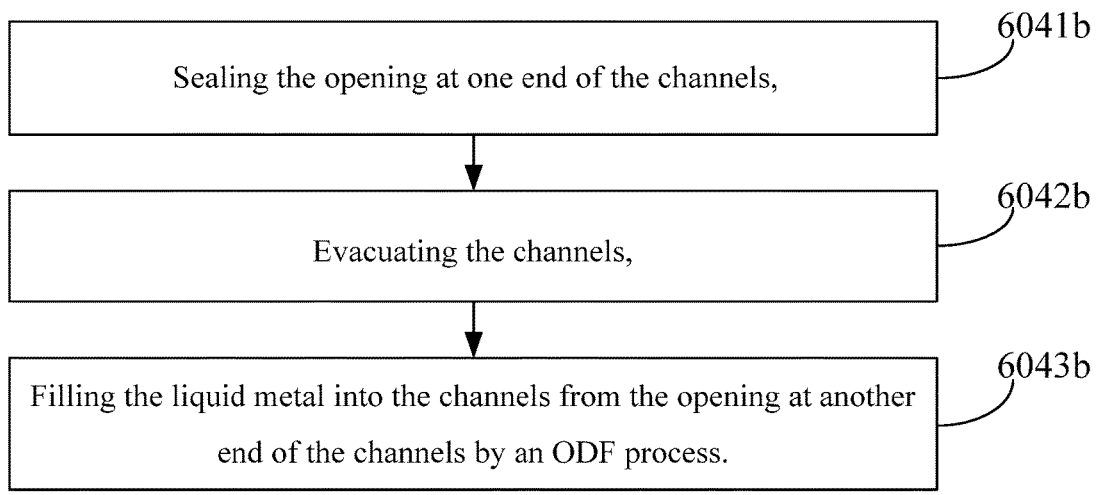
Figures 6, 7, 8, 9, 10, 11, 12:
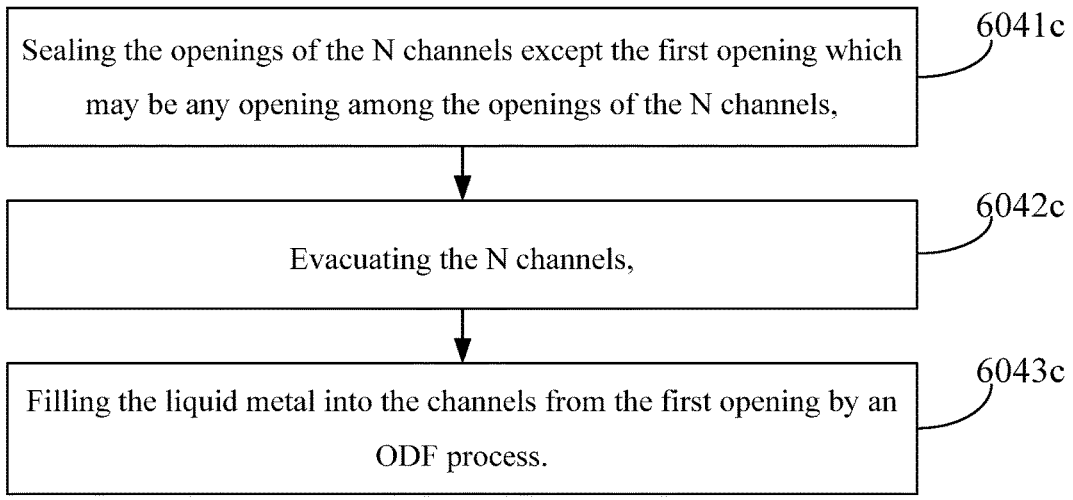
Figures 6, 7, 8, 9, 10, 11, 12, 13:
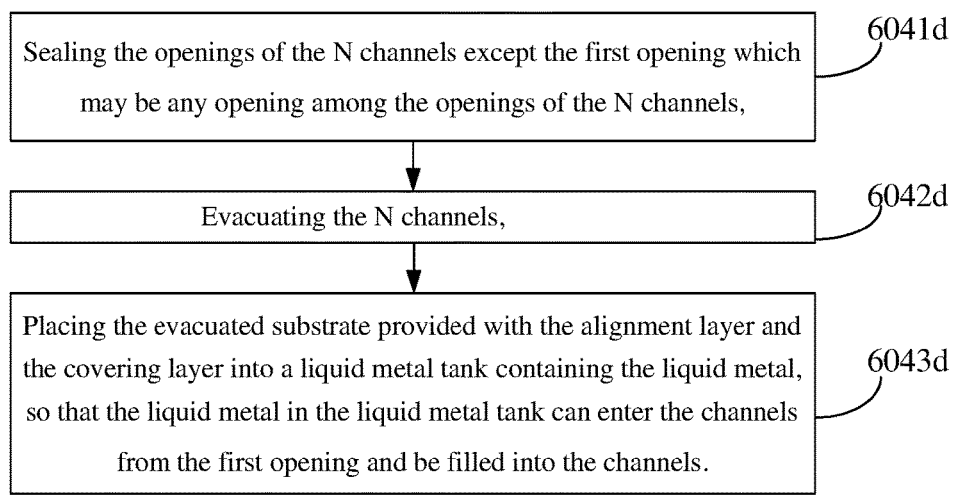
Figures 6, 7, 8, 9, 10, 11, 12, 13, 14:
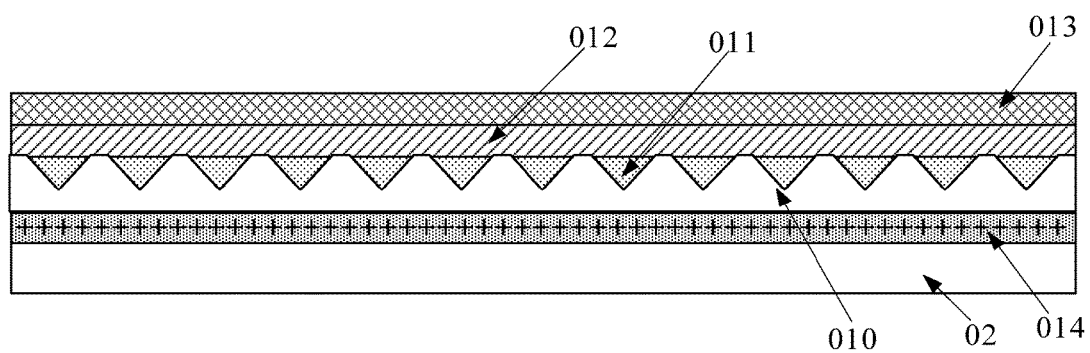
Figures 6, 7, 8, 9, 10, 11, 12, 13, 14, 15:
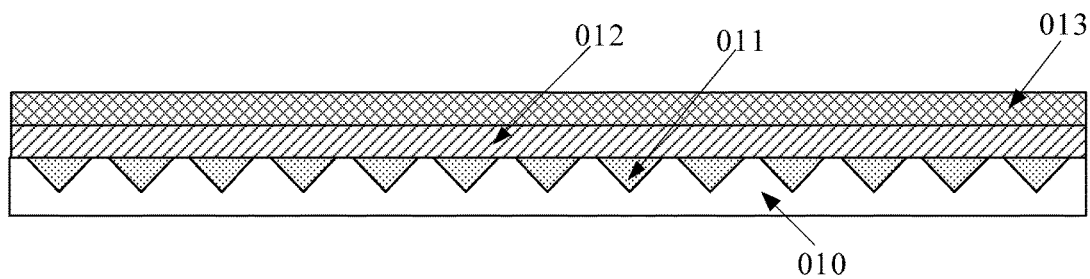
Figures 6, 7, 8, 9, 10, 11, 12, 13, 14, 15, 16:
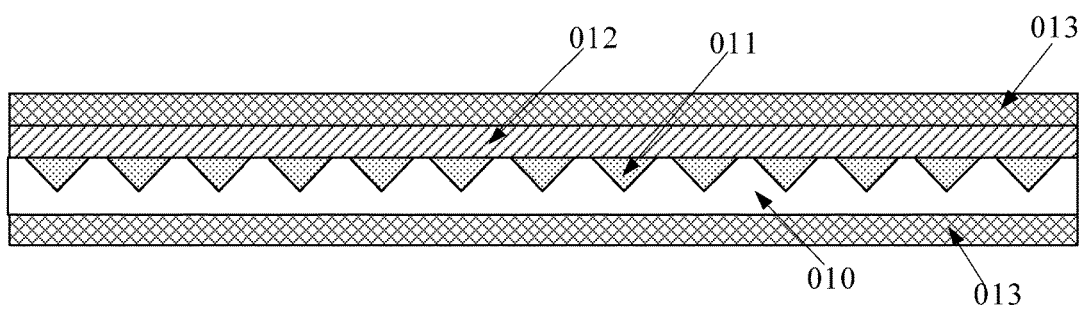
Figures 1, 7:
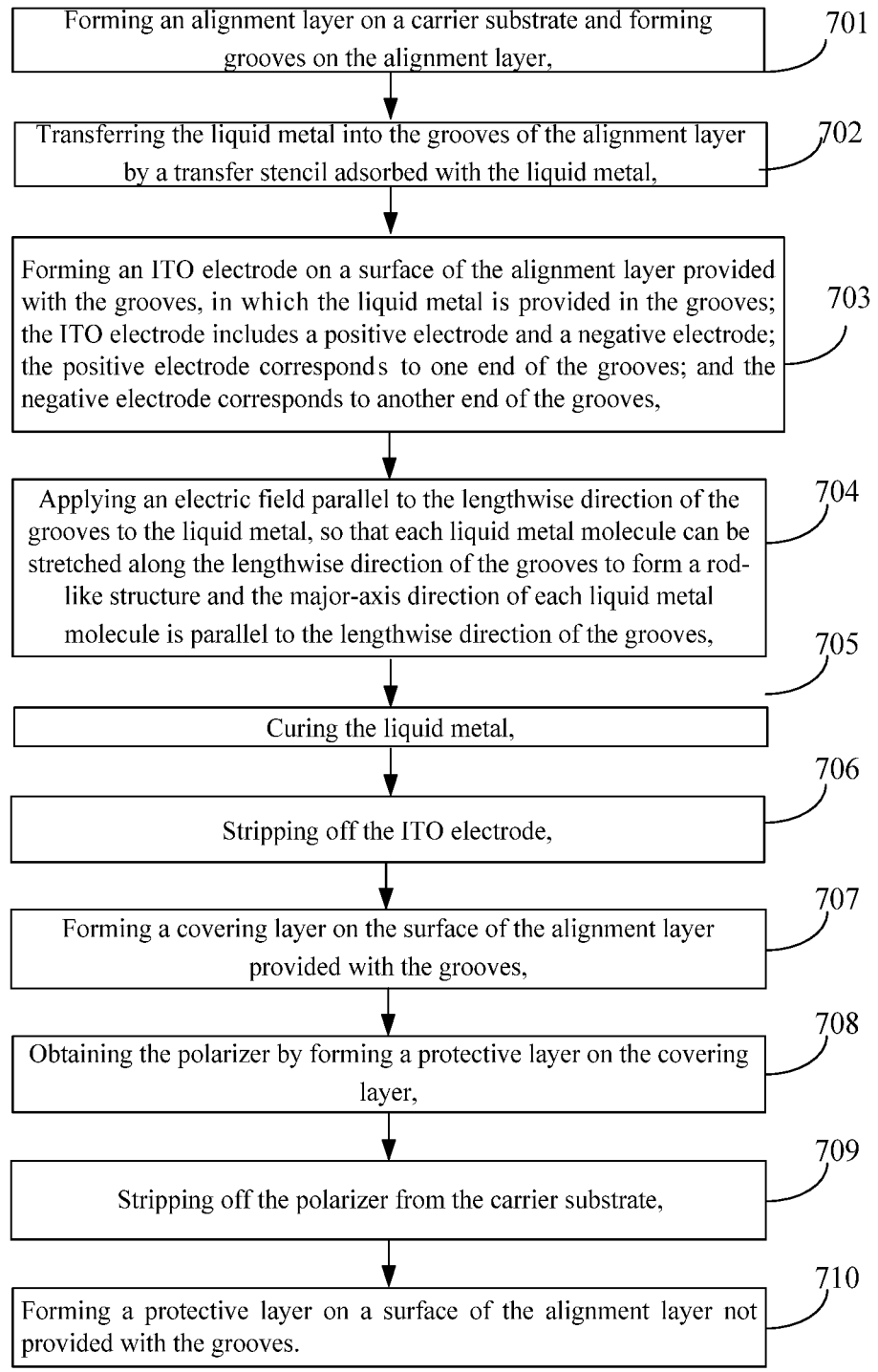
Figures 2, 7:
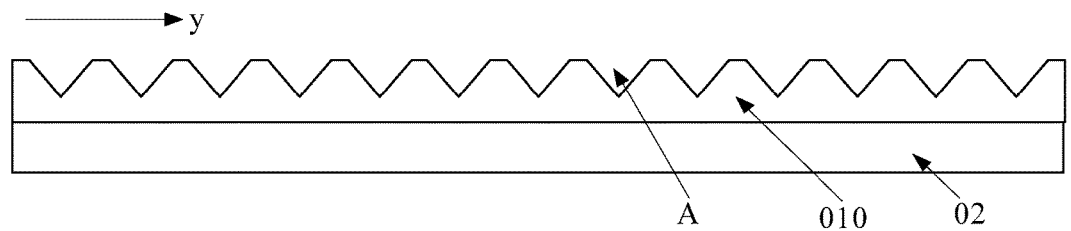
Figures 3, 7:
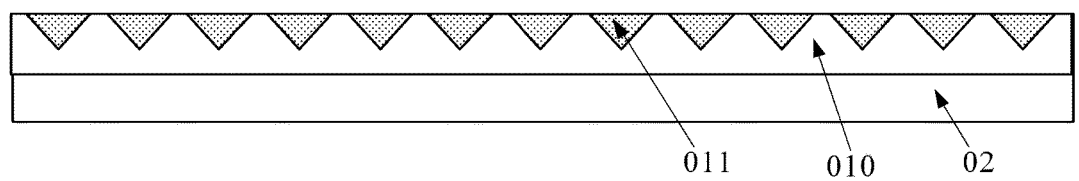
Figures 4, 7:
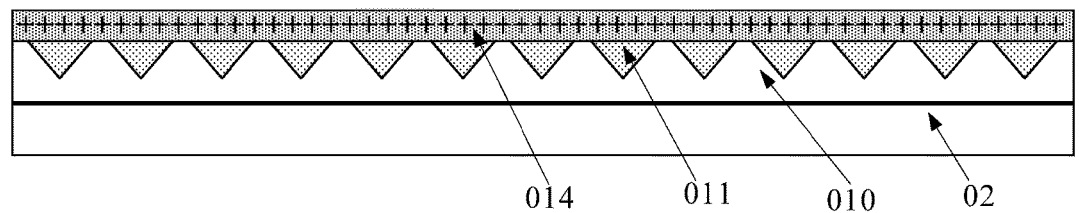
Figures 5, 7:
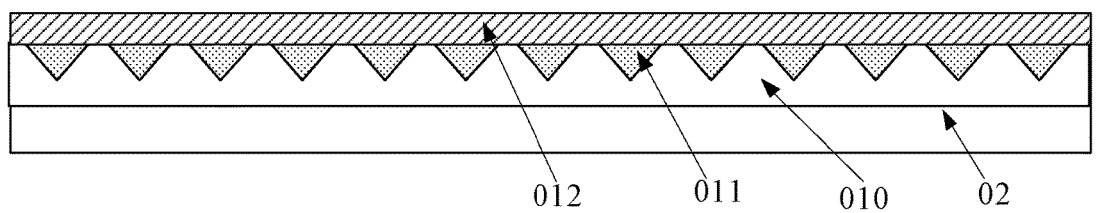
Figure 8:
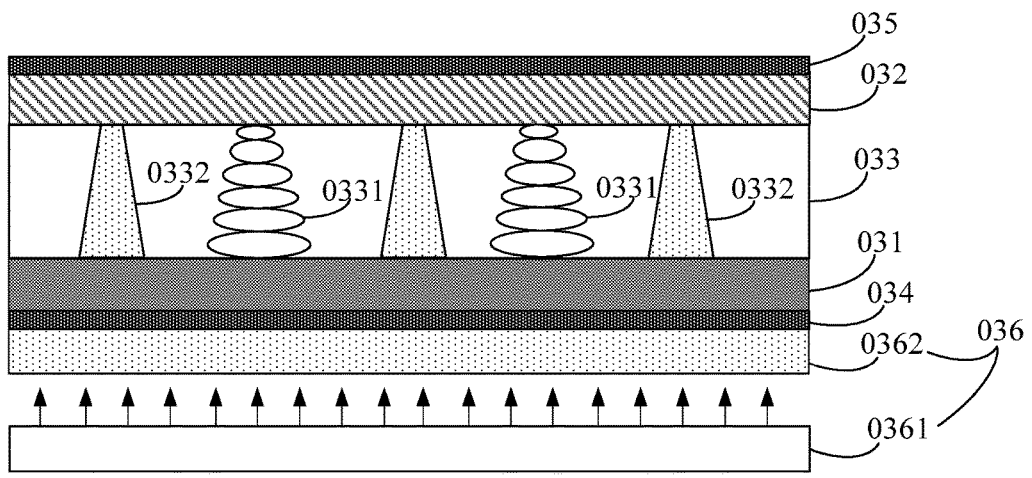
Figure 9:
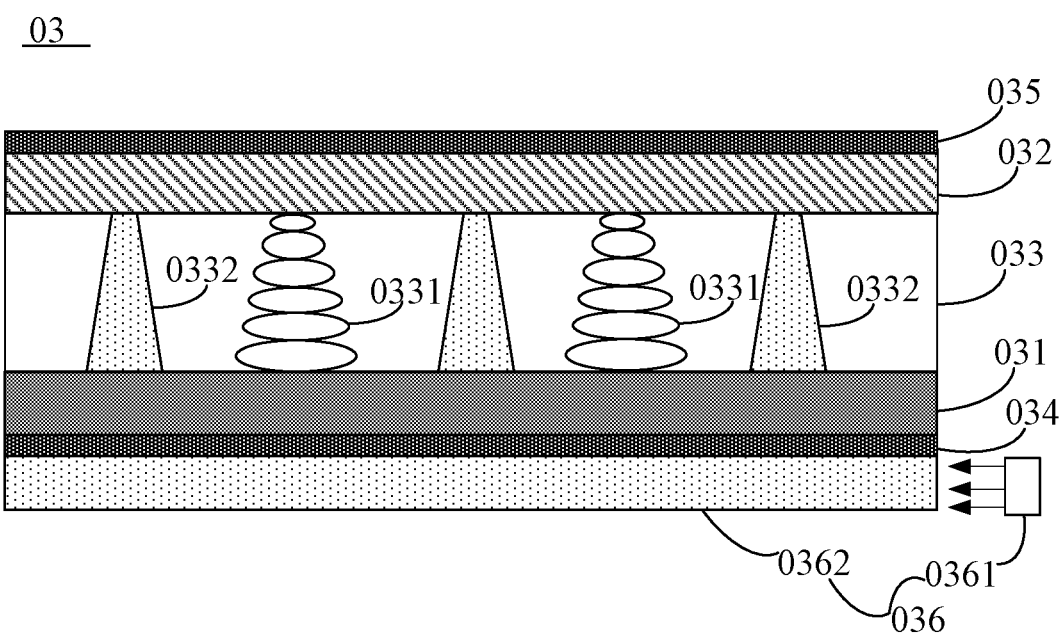

Moreover, as illustrated in FIG. 8, the display device 03 also includes a backlight 036. The backlight 036 is disposed on a side of the upper polarizer 034 away from the array substrate 031. Optionally, the backlight 036 may include a light source 0361 and a light guide plate (LGP) 0362. As illustrated in FIG. 8, the light source 0361 may be disposed on the side of the upper polarizer 034 away from the array substrate 031, and the LGP 0362 may be disposed between the light source 0361 and the upper polarizer 034. In this way, the backlight 036 may be referred to as direct-lit backlight; or as illustrated in FIG. 9, the LGP 0362 may be disposed on a side of the upper polarizer 034 away from the array substrate 031, and the light source 0361 may be disposed on a side surface of the LGP 0362. In this way, the backlight 036 may be referred to as side-lit backlight.

As stated above, the display device provided by the embodiment of the present disclosure includes the polarizer; in the polarizer, the alignment layer is formed on the carrier substrate and the grooves are formed on the alignment layer; the liquid metal is formed in the grooves; an electric field parallel to the lengthwise direction of the grooves is applied to the liquid metal, so that the liquid metal structure can be stretched along the lengthwise direction of the grooves to form a rod-like structure and the major-axis direction of the liquid metal structure is parallel to the lengthwise direction of the groove; subsequently, the liquid metal is cured to obtain the polarizer; and the polarizer is stripped off from the carrier substrate. The major-axis direction of the liquid metal structure is parallel to the lengthwise direction of the groove, and the minor-axis direction of the liquid metal structure is the polarization direction of the polarizer. In the display device provided by the embodiment of the present disclosure, the liquid metal is adopted to achieve the polarization direction of the polarizer, so that the polarization direction of the polarizer can be readily controlled and the yield of the polarizer can be higher, and the display performance of the display device can be improved.

The term "and/or" in the present disclosure only refers to a relationship of described association objects and indicates that three relationships may exist. For instance, A and/or B may indicate the following three situations: the presence of A alone, the presence of A and B simultaneously, and the presence of B alone. In addition, the character "/" herein generally indicates that the associated objects have an "or" relationship.

It is understood by one of ordinary skill in the art that all or part of steps of the embodiments may be finished by hardware and may also be finished by instructions of related hardware through a program. The program may be stored into a computer-readable storage medium, and the storage medium may be a read-only memory, a magnetic disc, a compact disc (CD), or the like.

In the polarizer, the manufacturing method thereof and the display device, provided by the embodiment of the present disclosure, the alignment layer is formed on the carrier substrate and the grooves are formed on the alignment layer; the liquid metal is formed in the grooves; an electric field parallel to the lengthwise direction of the grooves is applied to the liquid metal, so that the liquid metal structure can be stretched along the lengthwise direction of the grooves to form a rod-like structure and the major-axis direction of the liquid metal structure is parallel to the lengthwise direction of the grooves; subsequently, the liquid metal is cured to obtain the polarizer; and the polarizer is stripped off from the carrier substrate. The major-axis direction of the liquid metal structure is parallel to the lengthwise direction of the groove, and the minor-axis direction of the liquid metal structure is the polarization direction of the polarizer. The polarizer provided by the embodiment of the present disclosure adopts the liquid metal to achieve the polarization direction of the polarizer, so that the polarization direction of the polarizer can be readily controlled and the yield of the polarizer can be higher.

It is understood that the embodiments are only exemplary embodiments for demonstrating the principles of the embodiments of the present disclosure. But the embodiments of the present disclosure are not limited thereto. Any modification, equivalent replacement, improvement or the like made within the spirit and the principle of the present disclosure shall fall within the scope of the present disclosure.

The application claims priority to the Chinese patent application No. 201510320735.7, filed on Jun. 11, 2015 and entitled "Polarizer, Manufacturing Method Thereof and Display Device", which is incorporated herein by reference in its entirety.

The invention claimed is:

1. A method of manufacturing a polarizer, the method comprising:
    forming an alignment layer on a carrier substrate and forming grooves on the alignment layer;
    providing liquid metal in the grooves, in which the liquid metal includes a plurality of liquid metal structures;
    applying an electric field parallel to a lengthwise direction of the grooves to the liquid metal, to allow each liquid metal structure to be stretched along the lengthwise direction of the grooves to form a rod-like structure and a major-axis direction of the liquid metal structures is parallel to the lengthwise direction of the grooves;
    obtaining the polarizer by curing the liquid metal; and
    stripping off the polarizer from the carrier substrate.

2. The method according to claim 1, further comprising:
    before providing the liquid metal in the grooves, forming a covering layer on a surface of the alignment layer provided with the grooves, to allow channels provided with openings at both ends to be formed between the alignment layer and the covering layer,
    wherein the providing the liquid metal in the grooves includes filling the liquid metal into the channels.

3. The method according to claim 2, wherein the filling the liquid metal into the channels includes:
    evacuating the channels; and
    placing the evacuated substrate provided with the alignment layer and the covering layer into a liquid metal tank containing the liquid metal, and filling the liquid metal in the liquid metal tank into the channels.

4. The method according to claim 2, wherein the filling the liquid metal into the channels includes:
    sealing the opening at one end of the channels;
    evacuating the channels; and
    filling the liquid metal into the channels from an opening at the other end of the channels by a one drop filling (ODF) process.

5. The method according to claim 2, wherein the number of the channels is N, which is a positive integer greater than or equal to 2, and the N channels are communicated with each other; and
    the filling the liquid metal into the channels includes:
        sealing the openings of the N channels, except for a first opening which can be any opening among the openings of the N channels;
        evacuating the N channels; and
        filling the liquid metal into the channels from the first opening by a one drop filling (ODF) process.

6. The method according to claim 2, wherein the number of the channels is N, which is a positive integer greater than or equal to 2, and the N channels are communicated with each other; and
    the filling the liquid metal into the channels includes:
        sealing the openings of the N channels, except for a first opening which can be any opening among the openings of the N channels;
        evacuating the N channels; and
        placing the evacuated substrate provided with the alignment layer and the covering layer into a liquid metal tank containing the liquid metal, to allow the liquid metal in the liquid metal tank to enter the channels from the first opening and fill the channels.

7. The method according to claim 2, further comprising:
    after providing the liquid metal in the grooves, forming a protective layer on the covering layer.

8. The method according to claim 1, further comprising:
    before forming the alignment layer on the carrier substrate and forming the grooves on the alignment layer, forming an indium tin oxide (ITO) electrode on the carrier substrate, wherein the ITO electrode includes a positive electrode and a negative electrode, wherein the forming the alignment layer on the carrier substrate and forming the grooves on the alignment layer includes:
        forming the alignment layer on the substrate provided with the ITO electrode and forming the grooves on the alignment layer, to allow one end of the grooves to be disposed on a corresponding area of the positive electrode on the alignment layer, and another end to be disposed on a corresponding area of the negative electrode on the alignment layer.

9. The method according to claim 1, wherein the providing the liquid metal in the grooves includes:
transferring the liquid metal into the grooves of the alignment layer by a transfer stencil adsorbed with the liquid metal; and
wherein the method further comprises:
after providing the liquid metal in the grooves, forming an ITO electrode on a surface of the alignment layer provided with the grooves, and providing the liquid metal into the grooves, wherein the ITO electrode includes a positive electrode and a negative electrode; the positive electrode corresponds to one end of the grooves;
and the negative electrode corresponds to another end of the grooves.

10. The method according to claim 9, further comprising:
after curing the liquid metal, stripping off the ITO electrode;
forming a covering layer on the surface of the alignment layer provided with the grooves; and
forming a protective layer on the covering layer.

11. The method according to claim 1, further comprising:
after stripping off the polarizer from the carrier substrate, forming a protective layer on a surface of the alignment layer not provided with the grooves,
wherein the alignment layer is made from polyimide (PI) materials, and wherein the forming the alignment layer on the carrier substrate and forming the grooves on the alignment layer includes:
forming the alignment layer on the carrier substrate by the PI materials; and
forming the grooves on the alignment layer by a rubbing process or a photo-alignment process.

12. The method according to claim 1, wherein the alignment layer is made from inorganic materials, and the forming the alignment layer on the carrier substrate and forming the grooves on the alignment layer includes:
forming the alignment layer on the carrier substrate by the inorganic materials; and
forming the grooves on the alignment layer by a micro-machining process.

13. The method according to claim 2, wherein the covering layer is a polyethylene terephthalate (PET) film.

14. The method according to claim 1, wherein the number of the grooves is N, which is a positive integer greater than or equal to 2, and the N grooves are arranged on the alignment layer in an array.

* * * * *